United States Patent [19]
Doggett et al.

[11] Patent Number: 5,677,955
[45] Date of Patent: Oct. 14, 1997

[54] ELECTRONIC FUNDS TRANSFER INSTRUMENTS

[75] Inventors: John Doggett, Brookline; Frank A. Jaffe, Sharon, both of Mass.; Milton M. Anderson, Fair Haven, N.J.

[73] Assignees: Financial Services Technology Consortium, New York, N.Y.; The First National Bank of Boston, Boston, Mass.; Bell Communications Research, Inc., Livingston, N.J.

[21] Appl. No.: 418,190

[22] Filed: Apr. 7, 1995

[51] Int. Cl.[6] .............. H04K 1/00; G06F 17/60; G06G 7/52
[52] U.S. Cl. .............. 380/24; 235/379; 380/30; 395/201; 902/2
[58] Field of Search .............. 380/30, 24; 235/379; 902/2; 395/201

[56] References Cited

U.S. PATENT DOCUMENTS

| | | | |
|---|---|---|---|
| 4,302,810 | 11/1981 | Bouricius et al. | 364/200 |
| 4,423,287 | 12/1983 | Zeidler | 235/379 |
| 4,823,264 | 4/1989 | Deming | 364/408 |
| 5,187,351 | 2/1993 | Clary | 235/379 |
| 5,191,613 | 3/1993 | Graziano et al. | 380/23 |
| 5,218,637 | 6/1993 | Angebaud et al. | 380/23 |
| 5,224,162 | 6/1993 | Okamoto et al. | 380/24 |
| 5,283,829 | 2/1994 | Anderson | 380/24 |
| 5,297,202 | 3/1994 | Kapp et al. | 235/379 |
| 5,321,751 | 6/1994 | Ray et al. | 380/24 |
| 5,326,959 | 7/1994 | Perazza | 235/379 |
| 5,465,299 | 11/1995 | Matsumoto et al. | 380/23 |
| 5,473,690 | 12/1995 | Grimonprez et al. | 380/24 |
| 5,530,755 | 6/1996 | Pailles et al. | 380/23 |

FOREIGN PATENT DOCUMENTS 0 542 298 A2  5/1993  European Pat. Off.  .......... G07F 7/10

OTHER PUBLICATIONS

Shipley, "I threw away my checkbook", PC-Computing, vol. 3, No. 11, pp. 112-120, Nov. 1990.
Diamond, "Check Processing Takes a New Turn", Computers in Banking, vol. 5, No. 3, pp. 50-55, Mar. 1988.
Morrall, "The Race to Offer Home Banking," Banking Marketing, vol. 26, No. 5, pp. 15-24, May 1994.
Knudson et al., "Business-to-Business Payments and the Role of Financial Electronic Data Interchange", Federal Reserve Bulletin, vol. 80, No. 4, pp. 269-278, Apr. 1994.
Murphy, "Electronic check clearing alternatives take shape", ABA Banking Journal, vol. 85, No. 5, pp. 62-65, May 1993.
Merkel, "Electronic Payor Strategies and Options", Journal of Cash Management, vol. 13, No. 1, pp. 12-21, Jan./Feb. 1993.
Costanzo, "Redoing the Payment System: Banks explore check processing options, including national net settlement system", Bank Technology News, p. 1, Jul. 1993.
Brubaker et al., "Electronic Check Presentment Is Ready For the Challenge of Same-Day Settlement", American Banker, vol. 158, No. 228, p. 21, Dec. 1, 1993.

(List continued on next page.)

*Primary Examiner*—Stephen C. Buczinski
*Attorney, Agent, or Firm*—Fish & Richardson P.C.

[57] ABSTRACT

An electronic instrument is created in a computer-based method for effecting a transfer of funds from an account of a payer in a funds-holding institution to a payee. The electronic instrument includes an electronic signature of the payer, digital representations of payment instructions, the identity of the payer, the identity of the payee, and the identity of the funds-holding institution. A digital representation of a verifiable certificate by the institution of the authenticity of the instrument is appended to the instrument. This enables a party receiving the instrument, e.g., the payee or a bank, to verify the authenticity of the account or account holder. The invention may be generally applied to any financial electronic document.

51 Claims, 14 Drawing Sheets

OTHER PUBLICATIONS

Kutler, "USA: Credit/Debit ATMS—Home Banking—Visa's Leap into Electronic Payment Is Just the Begin", American Banker, p. 11, Aug. 11, 1994.

Iida, "Electronic Presentment Due for N.Y. Test", American Banker, vol. 157, No. 143, p. 3, Jul. 27, 1992.

Deters, "Guaranteed checks", Arizona Republic, p. 1, Apr. 25, 1994.

Torrez, "Banking Industry Looks at Changing Check Guarantees", The Business Journal–Phoenix & The Valley of the Sun, vol. 9, No. 29, p. 1, May 29, 1989.

"Visa Acquires US Order: One Giant Step for Visa, One Giant Leap for Home Banking", EFT Report, vol. 17, No. 17, Aug. 17, 1994.

"Clearing Houses Act as Natural Stepping Stones to ECP", Item Processing Report, vol. 4, No. 2, Feb. 4, 1993.

"Major Check Industry Changes No Longer a Pipe Dream", Financial Services Report, vol. 9, No. 25, pp. 2–5, Dec. 23, 1992.

"Industry Players Discuss Check Truncation Solutions for Reducing Paper in the Payments System", Item Processing Report, vol. 1, No. 23, Dec. 20, 1990.

"New, Practical ACH Check Truncation Format Nears", Item Processing Report, vol. 1, No. 6, Apr. 26, 1990.

Visintin, "Technology Exists Now To End Check Handling", American Banker, vol. 159, No. 140, p. 13, Jul. 22, 1994.

Sullivan, "Bank Technology Trick or Treat?", Bankers Monthly, vol. 109, No. 11, pp. 10–20, Nov. 1992.

Seidenberg, "Bell Companies Now Testing Smart Card Offering Increased Feature Functionality", Card News, vol. 5, No. 10, pp. 5–6, May 21, 1990.

"General Magnaplate Corporation Issues Three–Month Report to Stockholders", PR Newswire, p. 1111A9862, Nov. 11, 1992.

Byles, "More Companies Are Paying Bills Electronically", Journal of Commerce, p. 2B, May 5, 1988.

Carreker, "Strides in Electronic Checking Transforming Payment System", vol. 68, No. 3, pp. 18–30, Mar. 1992.

```
<TEXTAREA NAME="associated-001" ROWS=6 COLS=40>Order Form Details:
------------------------------
QTY: 1    STOCK: 1234    PRICE: $19.95
                         TAX:   $0.99
                         TOTAL: $20.94      </TEXTAREA><BR>
Amount: <INPUT TYPE="text" NAME="amount" MAXLENGTH=9> <BR>
Pay To: <INPUT NAME="pay_to" VALUE="Vendor Inc."> <BR>
Pay To Account: <INPUT NAME="pay_to_account" VALUE="123456"> <BR>
Pay To Code: <INPUT NAME="pay_to_code" VALUE="1010101"> <BR>
Memo: <BR><TEXTAREA NAME="memo" ROWS=4 COLS=40></TEXTAREA>
```

FIG. 5

```
begin=echeck-001  ——4
    serial=3918273981273
    number=234
    date=1995/03/24
    amount=$19.95
    pay_to=Vendor Inc.
    pay_to_account=12345
    pay_to_code=1010101
    meta=include signer-011 1995/03/24 01:37
end=echeck-001
```

FIG. 7

```
sign-echeck-001=F830D7AB6F15C6E94D3A
                298DB710298F74A3EE79
                signer-011
                1995/03/24 03:27
```

FIG. 8

ELECTRONIC FUNDS TRANSFER INSTRUMENTS

BACKGROUND

The invention relates to electronic funds transfer instruments.

As seen in FIG. 1, in a typical financial transaction 10 a payer 12 transfers funds to a payee 14. Individual payers and payees prefer different payment methods at different times, including cash, checks, credit cards and debit cards. The transfer of funds between the payer 12 and the payee 14 may involve intermediate transactions with one or more banking institutions 16. The banks' functions include collecting and holding funds deposited by account holders and responding to instructions from the account holders. Checks are an example of financial transactions which invoke these banking institution functions.

FIG. 2 shows a paper check transaction 20, in which a check 22 is transferred from the payer 12 to the payee 14. The check 22 is typically found in a checkbook 24. Each check has several blank spaces (for the date 34, the name of the payee 30, the sum of money to be paid 28, and the signature of the payee 38) to be filled out by the payer 12. As each check is written, the payer 12 keeps a record of the check in a check register 26 which lists check transactions including the sum to be paid 28, the name of the payee 30, the identification number of the check 32, and the date of the transaction 34.

In the body of the check 22, the payer 12 instructs the payer's bank 36 to pay the stated sum of money 28 to the payee 14. The check 22 identifies the payer's bank 36, the payer's account number 40 (using magnetically readable characters) at the payer's bank, and the payer 23 (usually by printed name and address). After filling in the date 34, the name of the payee 30 and the sum of money 28 as ordered by the payee 14, the payer signs the check 22. A payee typically considers a check authentic and accepts it for payment if it contains the signature 38 of the payer, the printed identification of the payer 23 and the printed name and logo 42 of the payer's bank 36, and does not appear to be altered. The check 22 also contains a routing and transit number 25 which indicates the routing of the check to the payer's bank 36 for presentment.

After the payer 12 presents the completed check 22 to the payee 14 in a financial transaction (such as a sale of goods or services), the payee 14 endorses the check 22 on the back with the payee's signature 44 and deposits the check 22 with the payee's bank 46. If the check looks authentic, the payee bank 46 provisionally credits the payee's account 48 for the amount of money designated on the face of the check 28 pending clearance through the federal reserve system and acceptance and payment by the payer's bank 36.

The payee's bank 46 routes the check 22 to the payer's bank, possibly using the federal reserve bank clearing house 50 or other established clearing arrangement, which uses the routing and transit number 25 to deliver it to the payer's bank 36, which then verifies the authenticity of the check 22 and (at least for some checks) the signature 38 of the payer 12. If the check 22 is authentic and the payer 12 has sufficient funds in her account 40 to cover the amount of the check 28, the payer's bank 36 debits the payer's account 40 and transfers funds to the payee's bank 46 for the amount designated on the check 28. A complete check transaction 20 thus includes verification steps performed by the payee 14 and the payer's and payee's banks 36 and 46.

The banks 36 and 46 send bank statements 52 and 54 to the payer 12 and payee 14, respectively, which reflect the events of the transaction 20 pertinent to each of the parties for reconciliation of their accounts with their records.

Processing a paper check requires time as the physical check is routed to the payer, the payee, the payee's bank, the clearing house and the payer's bank. The same is true of other types of financial transactions involving paper instruments, such as credit card slips generated during a credit card sale. In a credit card transaction, a merchant makes an impression of the customer's card, which the customer then signs, to function as a receipt for the transaction. The merchant typically obtains a positive acknowledgement or credit authorization from the customer's credit card company before accepting the credit card slip. This assures that payment will be received.

Several mechanisms for using electronic communication to substitute for paper flow in financial transactions are in use or have been proposed.

Electronic Check Presentment (ECP) is a standard banking channel used to clear checks collected by banks prior to or without routing the physical checks. The Automated Clearing House (ACH) is an electronic funds transfer system used by retail and commercial organizations. The ACH acts as a normal clearing house, receiving a transaction over the network and then splitting and routing the debit and credit portions of the transaction to the payer's and the payee's banks. Electronic Data Interchange (EDI) is a similar electronic transactional system, primarily used for the interchange of business documents such as invoices and contracts. With EDI, the funds transfer is frequently transmitted over other financial networks, such as through electronic funds transfer or ACH.

So-called home banking allows a consumer to use a home or personal computer to, e.g., request that the bank pay certain bills.

Electronic funds transfer (EFT), or wire transfer, is used for direct transfer of funds from a payer to a payee, both usually corporations, using a bank's centralized computer as an intermediary. The EFT system may be used in conjunction with the ACH system described above.

Automatic teller machines (ATM) and point of sale (POS) devices allow an individual to conduct a transaction from a location outside the home. ATM's have remote computer terminals connected to the user's bank which allow access, directly or indirectly through switching networks, to the user's account in the central computer of the bank. Similarly, POS devices are remote computer terminals located at a place of business which allow access to an individual's account information stored in a computer within a network of financial institutions, to permit transfer of funds from the user's account to the merchant's account at another bank.

Check imaging, another electronic transaction procedure, involves the scanning of a paper check by a scanner, which digitizes the image of the check pixel by pixel and stores the image electronically in a memory. The image may then be transferred electronically to substitute for or precede the physical delivery of the check, e.g., to truncate the clearing process. The image of the check may be recreated on a computer monitor or on paper for verification by the appropriate banking institutions.

Several systems are currently used to secure electronic financial transactions. For example, IC chip cards, or smart cards, are small devices (containing chips with memories) which are capable of exchanging data with a computer or a terminal and of performing simple data processing functions, and are thus more versatile than a simple credit card. The smart card is portable and may be easily used in POS and ATM environments.

SUMMARY

In general, in one aspect, the invention features a computer-based method in which an electronic instrument is created for effecting a transfer of funds from an account of a payer in a funds-holding institution to a payee, the instrument including an electronic signature of the payer. A digital representation of a verifiable certificate by the institution of the authenticity of the account, the payer, and the public key of the payer is appended to the instrument. This enables a party receiving the instrument, e.g., the payee or a bank, to verify the payer's signature on the instrument.

Implementations of the invention may also include one or more of the following features. The electronic instrument may include digital representations of (a) payment instructions, (b) the identity of the payer, (c) the identity of the payee, and (d) the identity of the funds-holding institution. Digital representations of a verifiable signature of the payer may also be appended to the electronic instrument. The electronic instrument may be delivered electronically to the institution at least in part via a publicly accessible data communication medium. At the institution, the signature of the payer and the certificate may be verified in connection with transmitting funds to the payee. An account number may be included in the electronic instrument. The account may be a deposit account or a credit account. The instrument may be an electronic substitute for a check, a traveler's check, a certified check, a cashier's check, or a credit card charge slip. The publicly accessible data communication medium may be unsecured. The institution may be a bank.

Also appended to the instrument may be digital representations of a verifiable signature of the payee, a verifiable certificate by an institution which holds an account of the payee, and a verifiable certificate by a central banking authority with respect to the institution which holds the payee's account.

Delivery of the instrument may be in part via a private controlled secure communication medium and in part via a publicly accessible data communication medium. The electronic instrument may be delivered from an institution which holds an account of the payee to the funds-holding institution via an electronic clearing house.

At the payee, the signature of the payer and the certificate of the institution may be verified. At the institution holding an account of the payee, the signature of the payer and the certificate of the funds-holding institution may be verified.

The signatures may be generated by public key cryptography. The appending step may be done by a separate signature device from the device which performs the creation of the electronic instrument.

Digital representations of a proposed transaction and a verifiable signature of the payee may be delivered from the payee to the payer at least in part via the publicly accessible communication network.

Information may be automatically transferred from the electronic instrument to a computer-based accounting system that tracks accounts receivable or processes orders. A log of electronic instruments may be created.

In general, in another aspect, the invention features apparatus including a portable token having a memory, a processor, and a port for communication with a computer. The memory contains a private encryption key associated with an account in a funds-holding institution and which is usable to append a secure, verifiable signature to an electronic payment instrument drafted on the account.

Implementations of the invention may include one or more of the following features. The memory may contain certification information provided by the institution and which is usable to append secure, verifiable certificates to electronic payment instruments to certify a relationship between an owner of the signature and a public key of the owner. A unique identifier may be assigned to each electronic payment instrument. The portable token may be a PCMCIA compatible card, smart card or smart disk, which may internally hold a private signature key and a secure memory for the check serial number. The certification information may be given a limited useful life. The memory may also contain certification information provided by a central banking authority and which is usable to append secure, verifiable certificates to electronic payment instruments to certify the authenticity of the funds-holding institution. The certification information provided by the central banking authority may have a limited useful life. The central banking authority may be a United States Federal Reserve Bank. The memory may also contain a complete or partial register of electronic payment instruments, or a subset of the information contained in the instruments, to which signatures have been appended. The appended signature may be a signature of a payer who holds the account in the institution, or an endorsement signature of a payee. The memory may also contain a personal identification number for controlling access to the memory.

In general, in another aspect, the invention features a computer-based method of creating an electronic payment instrument. Digital payment data is formed which represents the identity of the payer, the identity of the payee, and the amount to be paid. Then, in a secure hardware token, a digital signature is appended to the data.

In general, in another aspect, the invention features a computer-based method of endorsing a payment instrument by entering information included in the payment instrument in digital form into a secure hardware token and, in the token, appending a digital signature to the digital information.

In general, in another aspect, the invention features a computer-based method for regulating the use of account numbers with respect to accounts in a funds-holding institution. Digital account numbers are assigned for use by account holders in creating electronic instruments, the digital account numbers being distinct from non-electronic account numbers used by account holders with respect to non-electronic instruments. At the fund-holding institution, electronic instruments are then accepted from account holders only if the electronic instruments include one of the digital account numbers. In implementations of this feature, each digital account number may be linked with a non-electronic account number, and the two numbers may be linked with a common account in the institution, so that electronic instruments and non-electronic instruments may be drawn against the same account.

In general, in another aspect, the invention features a computer-based method of attaching a document to a related electronic payment instrument by forming a cryptographic hash of the document, and appending the hash to the electronic payment instrument.

In general, in another aspect, the invention features a computer-based method for reducing fraud with respect to deposit of an electronic instrument with a funds-holding institution. A key-encrypted signature of the payee, a public key of the payee, a routing code of the institution, and a number of the payee's account in the institution are included with the instrument, and, at the institution, there is automatic checking of the routing code and the account number before accepting the electronic instrument.

In general, in another aspect, the invention features a computer-based method for reducing fraud associated with an electronic payment instrument. A cryptographic signature associated with a party to the instrument is appended to the instrument. Upon receipt of an electronic payment instrument, there is automatic checking of the cryptographic signature against cryptographic signature information of other electronic payment instruments previously received.

Advantages of the invention may include one or more of the following.

The invention provides an all-electronic payments and deposit gathering instrument that can be initiated from a variety of devices, such as a personal computer, screenphone, ATM or payments accounting system. Financial accounts may be rapidly and securely settled between trading partners over open public or proprietary networks, without requiring pre-arrangement, by interconnection with the existing bank clearing and settlement systems infrastructure. The integration of controlled existing banking communication systems with rapidly growing public networks in a secure fashion will allow for implementation and acceptance by banking institutions, industry, and consumers.

The invention addresses the problem of gathering deposits electronically over public networks, since it enables all customers, retail and commercial, to gather, transmit and deposit, e.g., checks, into their accounts without physically going to a bank branch. The invention provides an electronic payment alternative for trading using public data networks to conduct transactions.

The invention to a degree electronically mimics heavily-used and well-understood existing paper check processes to enable it to be readily accepted by the marketplace. By retaining the basic characteristics and flexibility of, e.g., the paper check, the invention may be adopted more rapidly. Due to its similarity to, e.g., paper checks, the invention can be used within the structure of existing laws, regulations, and standard business practices.

A variety of types of payment instruments may be implemented, e.g., certified checks, cashiers checks and credit card charge slips, and additional capabilities may be provided, e.g., future dating, limit checks, and multi-currency payments.

The invention may be used in all market segments, from individual consumers to large corporations. It will enable businesses to safely and cheaply complete payments over public networks. Because the contents of the payment instrument may be attached to the trading partner's remittance information, the instrument will easily integrate with existing or new applications, such as accounts receivable systems.

The security of the payment instruments enables open public networks to be linked to the financial payments and bank clearing networks in a secure fashion. The use of digital signatures, hardware based signing, and banks as certification agents, make the instruments trusted and secure. They are tamper-resistant due to the use of cryptographic signatures. This will provide greater security and reduced fraud losses for all parties in the payments process by eliminating most of the common causes of bad paper checks. To provide confidentiality, the instruments may also be encrypted when sent over public networks.

The use of public-key certificates enables easy electronic authentication by a payee, and the payee's and payer's banks. Digital signatures can be validated automatically.

Since the system can be fully automated, and new processing can be done outside of existing applications, such as a standard Demand Deposit Account (DDA), the cost of processing an electronic instrument will be quite low, and the costs of implementation minimized. To further minimize implementation costs, the electronic instruments may be integrated with the existing bank infrastructure, including some of the mechanisms currently used for interbank clearing of checks and electronic payments, such as bilateral arrangements, ACH and ECP.

Payers of all sizes gain substantial benefits. The use of electronic checks will be more cost effective than existing paper checks due to volume efficiencies and the automatic processing capabilities of computers. The use of electronic mail or electronic transmission is less costly than physically transporting paper. In addition to the significantly reduced costs of creating and mailing a payment (no check stock, envelopes, stamps, or incremental labor), the payer gains the ability to control the timing of payments, both through future dating of payments and through the increased reliability and delivery speeds of electronic mail.

The invention addresses the problem of fraud and supports prudent fraud management through integrated fraud prevention measures and distributed liability for fraud. These mechanisms will reduce most of the current causes of fraud, including forgery, alteration, duplication, and fraudulent depositing. In addition, because the electronic check implementation follows the check payment model, the potential liability of the banks for fraudulent transactions will be limited while equitably sharing the responsibilities for the integrity of the system among payer, payee, and banks.

An electronic check may be issued from personal financial software and other computing applications, through the use of an open programmatic tool set and application programming interfaces. Electronic instruments capability can be directly integrated into a payer's application, and does not require that a payer "go off-line" to complete a transaction. This benefit will be available to both consumers, through integration with packages such as Intuit's Quicken™, and businesses through integration with existing accounting systems.

Other advantages and features of the invention will become apparent from the following description and from the claims.

DESCRIPTION

FIG. 5 is a format of an electronic check template example for use with the World Wide Web.

FIG. 7 is a block format of a portion of an electronic check.

FIG. 8 is a format of a digital cryptographic signature based on DDS.

At first we describe an implementation of the invention called an electronic check.

The electronic check is an electronic financial instrument which in some respects mimics the paper check. It is initiated and routed electronically, uses digital signatures for signing and endorsing, and relies on digital cryptographic certificates to authenticate the payer and payee and their respective banks and bank accounts and to provide a degree of security to all parties to the transaction.

Figure 1:
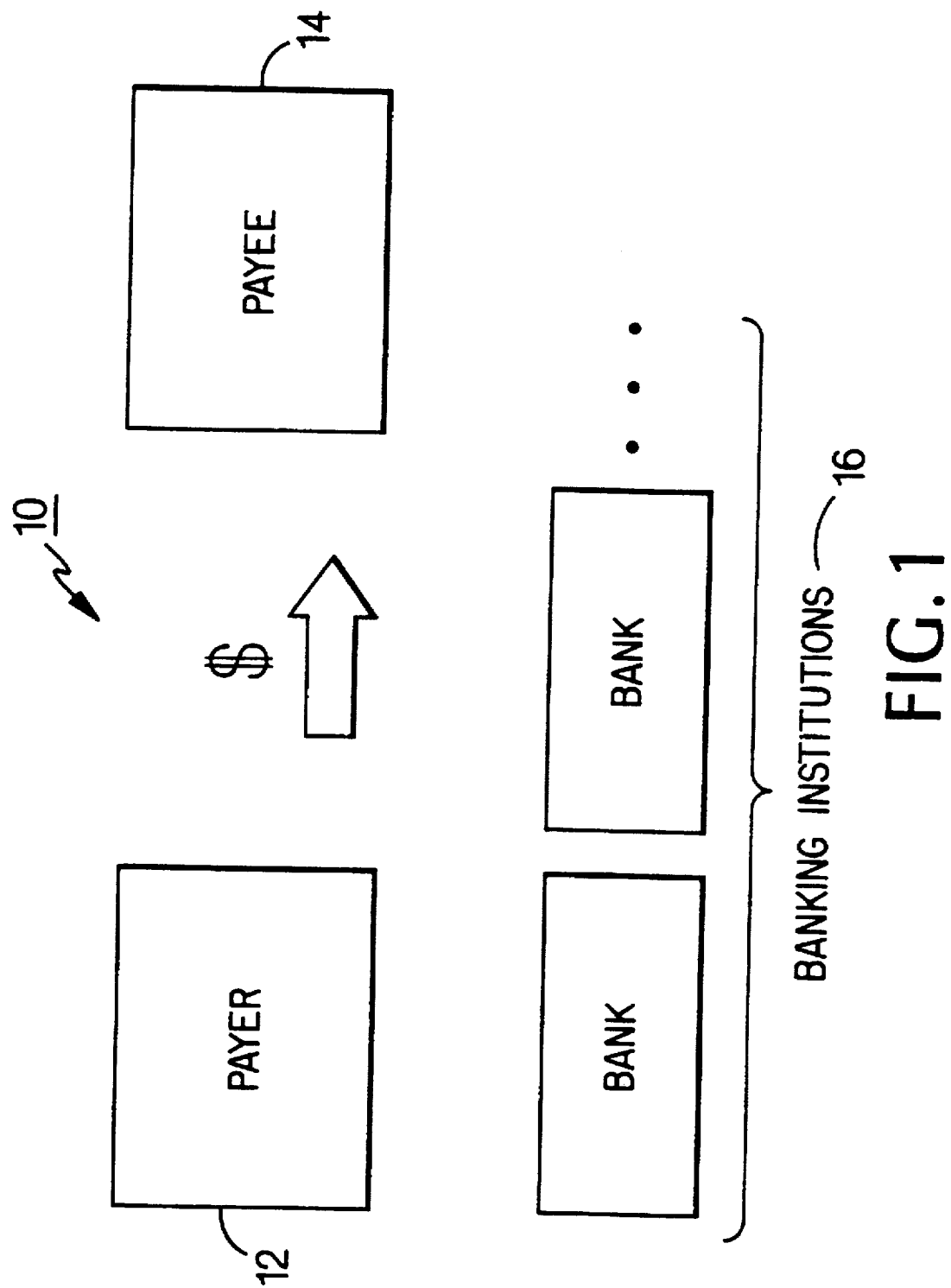
FIG. 1 is a block diagram of a financial transaction.
Figure 2:
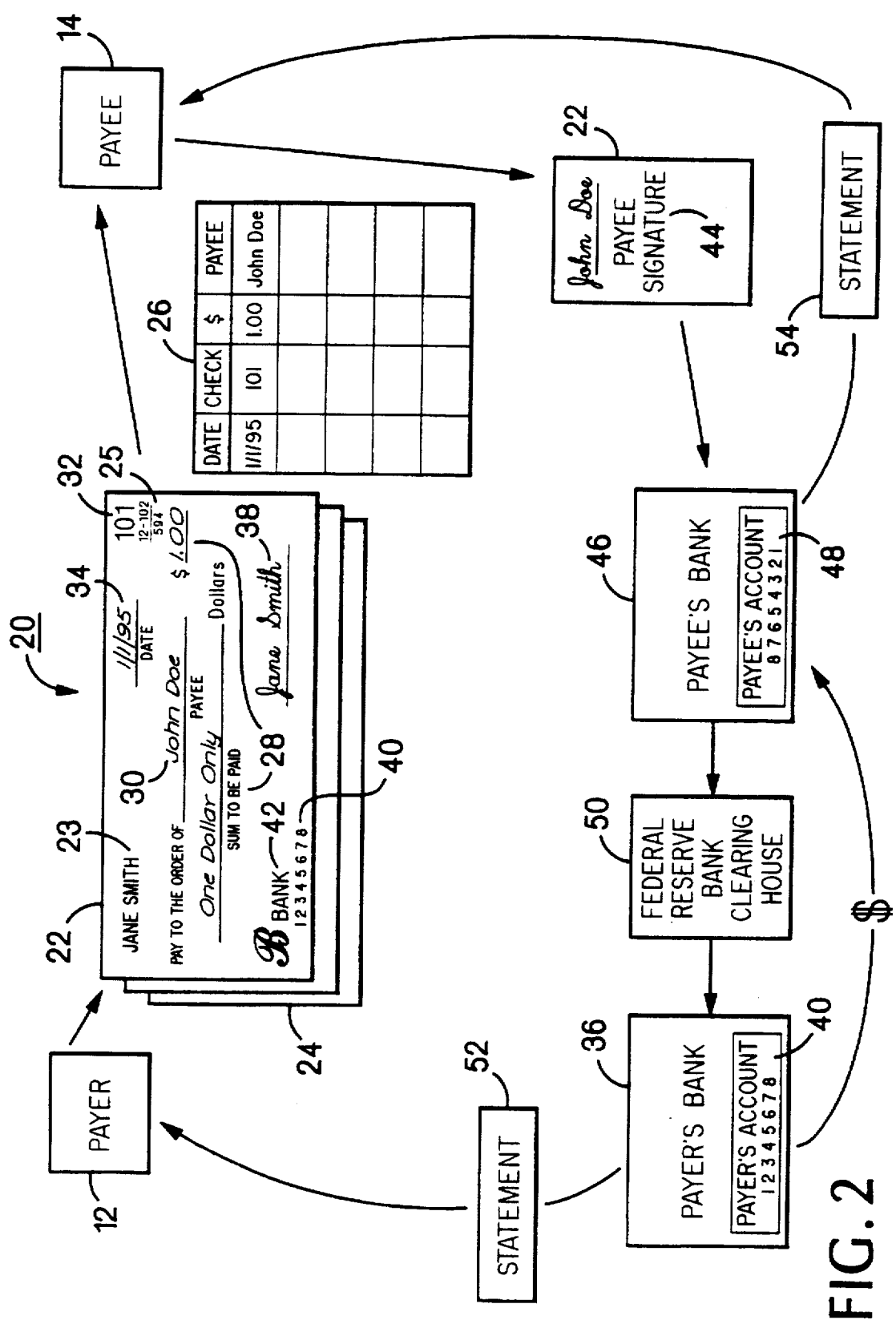
FIG. 2 is a flow diagram of the steps of a check transaction.
Figure 3:
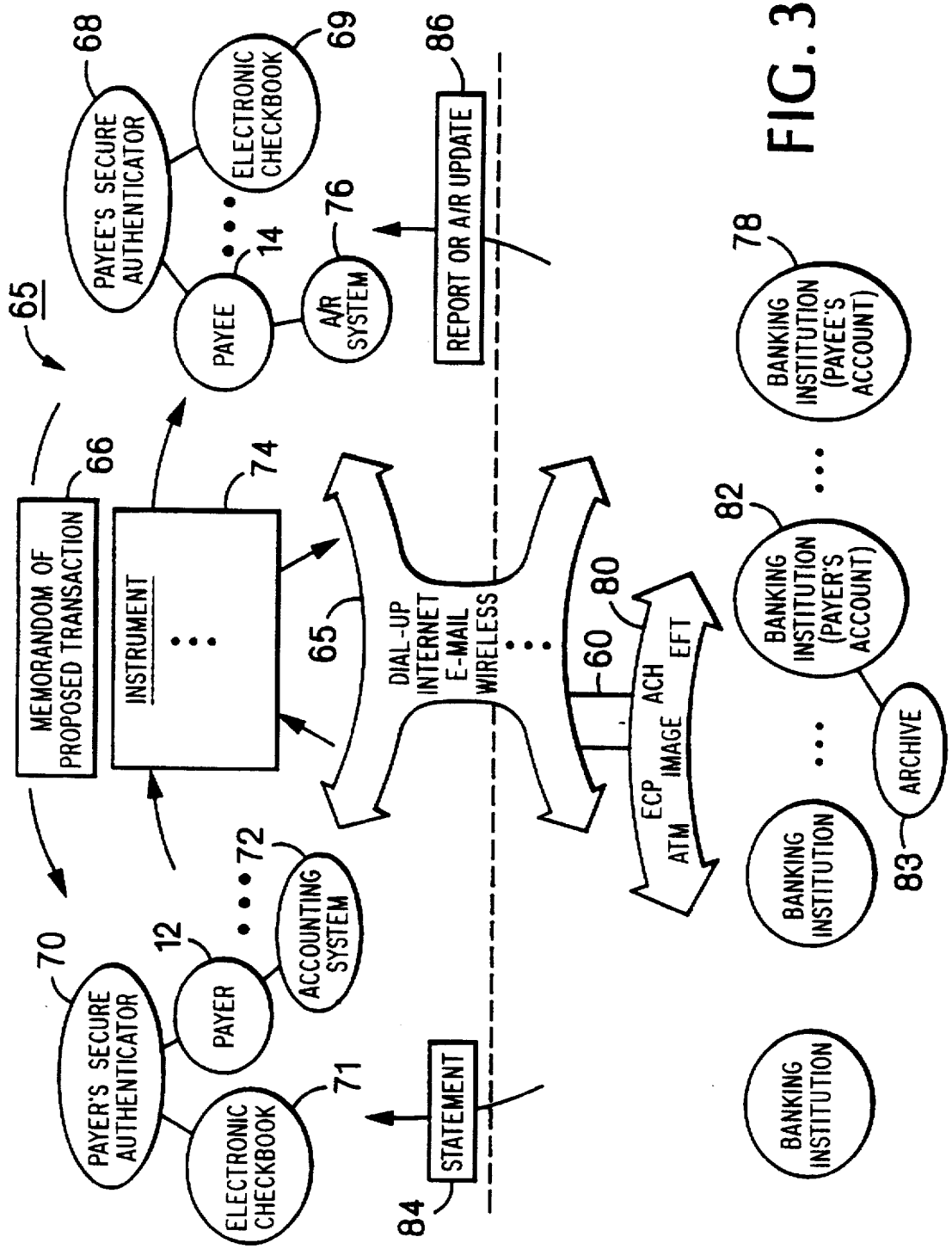
FIG. 3 is a flow diagram of the steps of an electronic instrument transaction.

As seen in FIG. 3, the use of electronic checks may take advantage of the interaction between publicly available, relatively unsecure electronic networks 65, such as the dial-up, Internet, wireless, or e-mail networks, and established, relatively secure non-public financial networks and systems 80. Public networks and banking networks are distinct entities in terms of the security of information during transmission over the two types of networks. Existing communications approaches in the banking system are secure and well disciplined. Public electronic networks are unsecured and to some degree less disciplined. The cryptographically sealed and authenticated electronic check passing across gateway 60 is the link between the public networks and secured financial networks. The gateway filters undesired traffic through and helps to prevent corruption of the secure financial networks resulting from intentional or unintentional access by persons operating in the public networks.

As seen in FIG. 3, in a broad sense, a transaction is initiated when a payer 12, e.g., a consumer, electronically receives a memorandum of a proposed transaction 66, such as a bill, invoice or order form, from a payee 14, e.g. a merchant. Alternatively, a transaction may be initiated by the payer 12 only. The memorandum 66 may contain the payee's digital signature, which may be generated by the payee's secure authenticator 68 using public key cryptography. The payer 12 validates the payee's signature by using the payer's public key to verify the payee's digital signature and thus authenticates the payee 14. To proceed with the transaction, the payer 12 electronically creates a financial instrument 74, e.g. an electronic check (e.g., on a personal computer), payable to the order of the payee 14, and signs and records it using the payer's secure authenticator 70. In effect, the secure authenticator 70 enables the payer 12 to digitally sign the instrument 74 with a private signature key and enter the transaction in a secure log, such as an electronic checkbook 71. A record of the transaction may also be kept in the payee's accounting system 72. The authenticator also appends to the check cryptographically signed certificates of, e.g., the payer's bank and the federal reserve bank authenticating the payer's account and the payer's bank, respectively. The payer 12 then electronically sends the instrument 74 and the memorandum 66 via a public network 65 to the payee 14.

Upon receipt of the instrument 74 from the payer 12, the payee 14 validates the payer's digital signature using public key cryptography. The payee 14 verifies the payer's bank 82 and the payer's account with the certificates. The payee 14 also verifies that the instrument 74 is not a recent duplicate, and holds it in storage until the date specified by the payer 12, if necessary. The payee 14 endorses the instrument 74 with the payee's digital signature using its authenticator 68. In effect, this enables the payee 14 digitally to sign the instrument 74 with a private signature key and enters the transaction in a secure log, such as an electronic checkbook 69. The authenticator also appends to the check cryptographically signed certificates of, e.g., the payee's bank and the federal reserve bank authenticating the payee's account and the payee's bank, respectively. The payee 14 detaches the memorandum 66 and forwards the memorandum and appropriate payment information from the electronic check to the payee's accounts receivable system 76. Finally, the payee 14 electronically deposits, typically via a public network, the instrument 74 with the banking institution which maintains the payee's account 78.

The payee's bank 78 receives the endorsed instrument 74 deposited by the payee 14, validates both the payee's digital signature of endorsement and the payer's original digital signature using public key cryptography, verifies that the instrument 74 is not a recent duplicate and that the date of the instrument 74 is valid and checks the certificates. The payee's bank 78 then credits the sum of money specified in the instrument 74 to the payee's account and clears the instrument 74 with the payer's bank 82 via existing electronic settlement procedures, e.g., bilateral arrangement, ECP, ACH, ATM, EFT, or check imaging. The settlement procedures are carried out over a network 80 connecting the computers of a large number of banking institutions, the network 80 itself indirectly connected with the public network 65.

After clearance of the instrument, the payer's banking institution 82 receives the processed instrument 74. The payer's bank 82 validates both the payer's and the payee's signatures using public key cryptography. The payer's bank 82 also verifies that the instrument 74 is not a duplicate and that the date of the instrument 74 is valid, and checks the certificates. If there are sufficient funds to cover the face value of the instrument 74 in the payer's account, the payer's bank 82 debits the payer's account, treating the item as a normal DDA transaction, and electronically sends payment to the payee's bank 78 over the financial network 80 to settle the payment. The instrument 74 is archived for permanent storage and retrieval 83 at the payer's bank or elsewhere.

After the transaction has been completed, the payer's bank 82 issues a DDA statement 84 to the payer 12 reflecting the debit to the payer's account, and the payee's bank 78 issues a statement, report or accounts receivable update 86 to the payee 14 reflecting the credit to the payee's account. Supplementary information related to the transaction in the instrument 74, such as the payer's and payee's names or memo lines, can be included in the statement 84 or the report 86. The information contained in the statement 84 and the report 86 may be automatically compared with the payer's accounting system 72 and the payee's accounts receivable system 74, respectively, to verify that the transaction was carried out properly.

Figure 4:
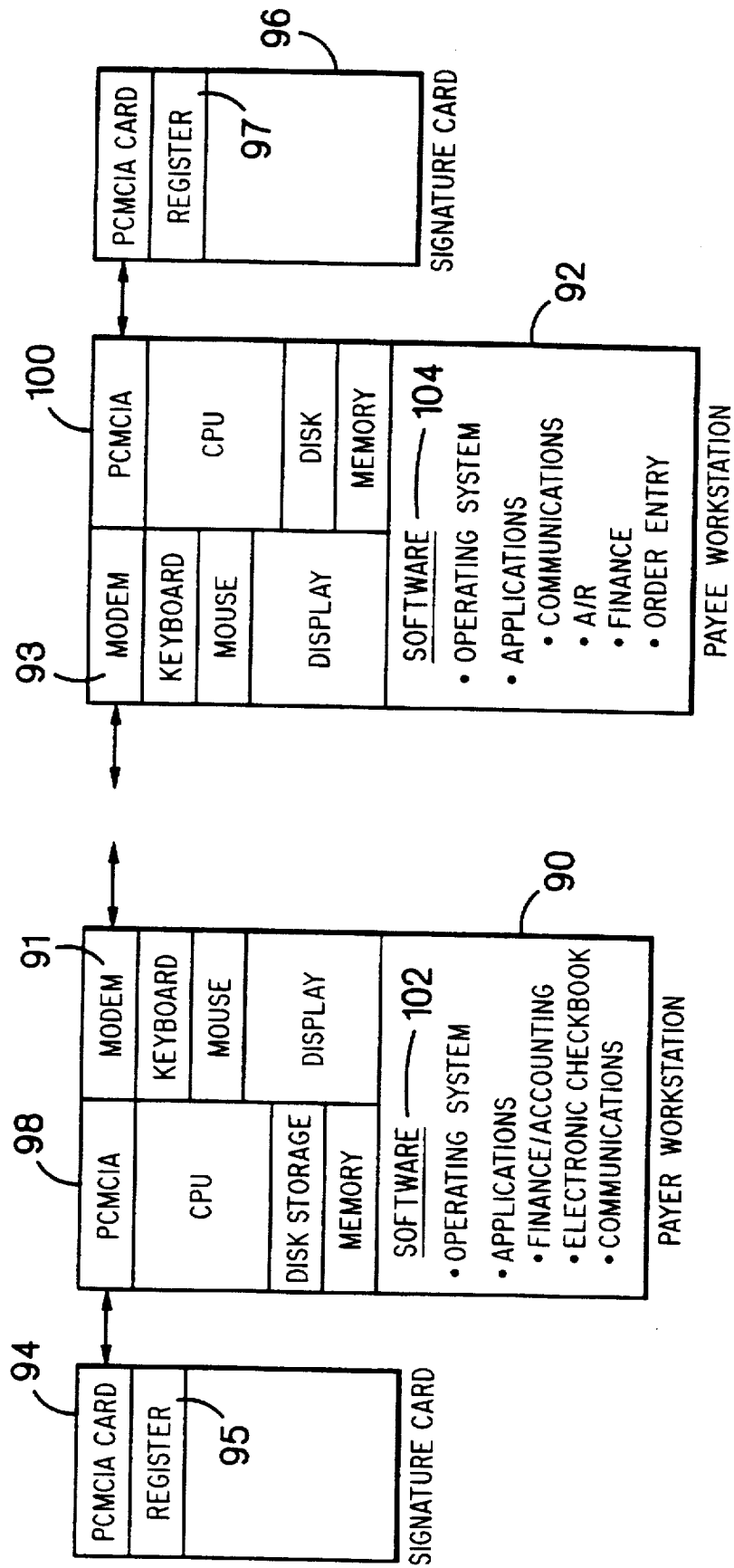
FIG. 4 is a block diagram of a workstation.

As seen in FIG. 4, a financial instrument such as an electronic check may be created or verified and endorsed at a computer terminal or workstation, such as the payer's workstation 90 or the payee's workstation 92. Both workstations have the same general format. Each has a CPU with disk storage and memory and a keyboard, mouse and display for interaction with the user. Modems 91 and 93 (or other network connections) are attached to the workstations 90 and 92 permit information, including the electronic check, to be passed electronically to other parties to the transaction via one of the electronic networks. Each workstation 90 and 92 also has a PCMCIA port 98 and 100, into which a signature card, such as a PCMCIA card 94 or 96, may be inserted. The PCMCIA card 94 or 96 is an electronic device that acts as the user's digital signature card, provides a secure means for generating a signature with a private signature key, and acts as an electronic checkbook. Alternatively, the electronic checkbook with its register may be a separate card from the digital signature card.

Each workstation 90 and 92 contains a software package 102 or 104 to be run by the CPU. Besides the usual operating system, the software package contains programs for handling electronic checks. The payer's workstation 90 has manipulations of the electronic checkbook as one of its software applications, including invoking the signature function of the PCMCIA card 94 to attach the payer's signature to an electronic check. The electronic checkbook application prepares an electronic check to be sent to the payee 14 upon the input of the necessary information by the payer 12 and records the transaction in a secure electronic register 95. The payer's workstation 90 also has finance software for keeping track of the payer's transactions and communications software for sending the electronic check and other information electronically over one of the networks from its modem 91 to another party's modem.

The payee's workstation 92 similarly has finance and communications software applications. However, the payee's workstation 92 has software for preparing an order or invoice to be sent to the payer 12. It also contains software for invoking the signature function of the PCMCIA signature card 96 to attach the payee's signature to an electronic check as an endorsement before the payee 14 sends the electronic check to the payee's bank for deposit.

The format of an electronic check is similar to the format of a conventional paper check. The electronic check is a standardized text block consisting of the check body, one or more signatures and one or more endorsements and certificates. It is formatted as a series of 7 bit ASCII text lines using a restricted character set in order to be compatible with a wide variety of electronic mail systems, including those implementing the Internet Simple Mail Transfer Protocol. The format of the electronic check is based on tagged value pairs. Each information line is composed of a label name and a value, e.g., amount=$19.95.

An electronic check is typically created with a template document, as seen in FIG. 5. The top portion 106 of the template 105 is contains the payee's remittance information. The bottom portion 107 of the template contains field that the payer completes to prepare the electronic check. The template may be sent by e-mail from the payee to the payer, in which case the payer can use an editor or word processor to enter order and remittance information. The check body can also be pre-formatted by the payee with the amount, "pay to the order of", and payer's public key lines already completed, allowing the payer to enter minimal information into the body of the electronic check before signing it. Alternatively, the payer can use a general template and an editor, word processor or other application, such as Quicken, to create a properly formatted electronic check.

Once the template is filled in by the payer, the electronic check is signed by passing it through the payer's electronic checkbook. The electronic checkbook is contained within a PCMCIA card containing the payer's private signature key and certificates from the bank and the federal reserve. The certificates are cryptographically signed letters of reference attesting to the validity of the payer's account and the payer's authority to write checks against the account, and the bank, respectively.

Figure 6:
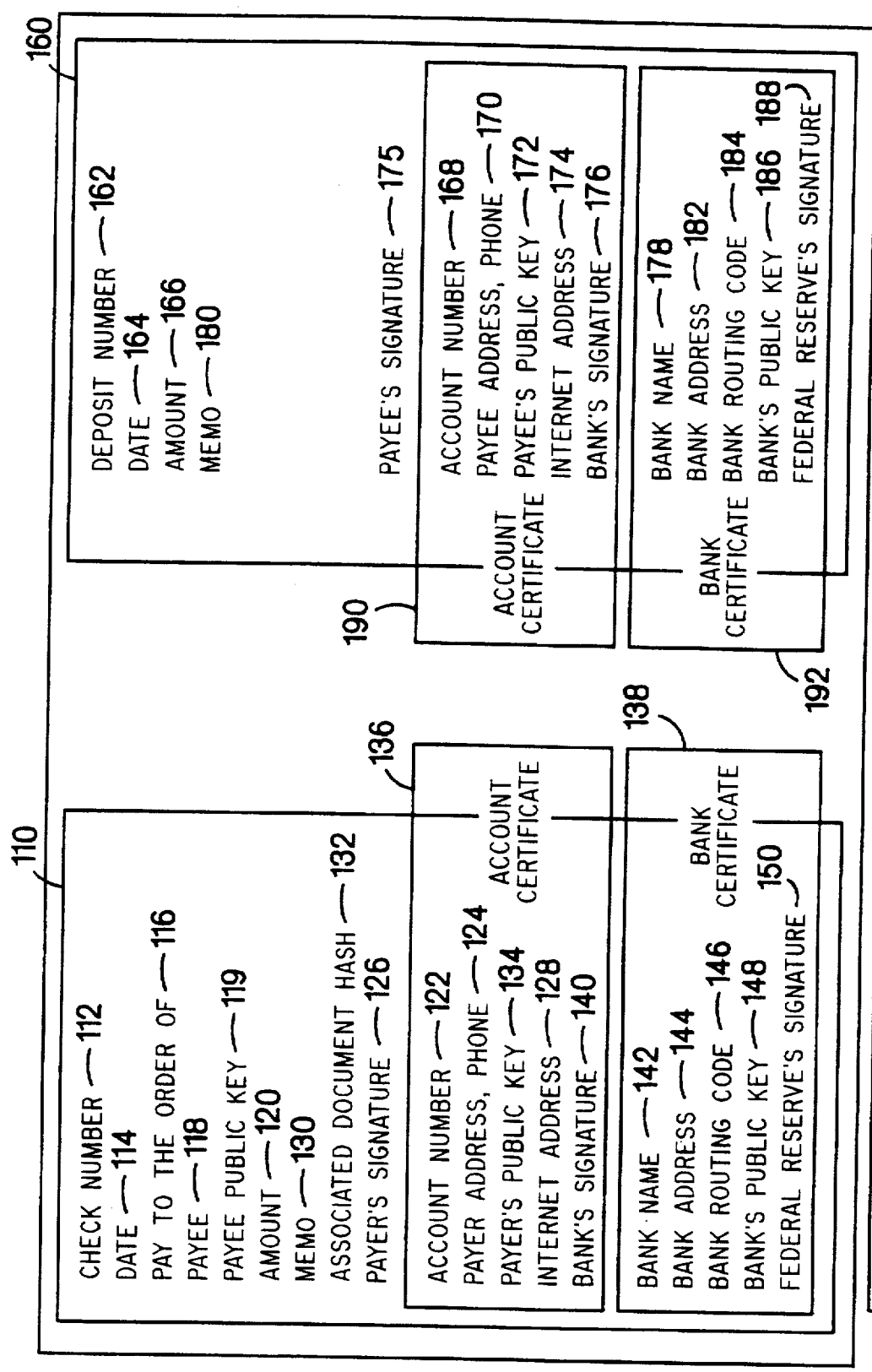
FIG. 6 is a format of an electronic check and deposit endorsement instrument.

For example, in FIG. 6, electronic check 110 contains an identification number for the electronic check 112, the date that the electronic check was created 114, an order to the bank to pay a certain sum of money 116, the name of the payee 118, the payee's public key 119, the sum of money to be paid 120, the payer's account number 122, the name, address and telephone number of the payer 124, and the payer's signature 126 in digital format verifiable using the payer's public signature key 134. An additional feature of an electronic check delivered over a public network is the payer's network address 128, e.g. an Internet address, to permit the payee to acknowledge receipt of the electronic check. The electronic check also may contain a memo line 130 for storing information personal to the payer and a secure hash algorithm (SHA) 132 resulting from a calculation over an associated document, to attach securely items such as an invoice received from the payee.

The standardized format of an electronic check makes it a flexible instrument, permitting multiple signatures, annotations and transformation into other document types. The standardized electronic check is also usable over different transportation means, such as the Internet and e-mail. In particular, the transport protocols include FTP, STTP and HTTP for the Internet. The format of the electronic check is independent of the transport protocol.

Further, the format of an electronic check is modular, in that several information lines can be grouped as a block, as seen in FIG. 7. Any number of information lines 3 grouped between begin and end lines 4 and 5 is a block 6. Each block has an identifying name which is used to reference it, and blocks can be combined to form other more complicated documents with a meta line 7. The modularity of electronic checks also allows for independent signature of any block by any entity and for use of the system for other financial instruments, such as letters of credit and loan documents.

The security and authentication aspects of electronic checks are supported by digital signatures using public key cryptography. Public key cryptography uses very large numbers and complex mathematical calculations to protect the integrity and secrecy of an encoded electronic transmission. As seen in FIG. 8, a digital cryptographic signature 101 is a long number or numbers (here expressed in hexadecimal notation) 102 which are produced by the signer's use of his private signature key and the message to be signed as inputs to the public key signature algorithm. The signature may also be accompanied by a date and time stamp 103. The cryptographic infrastructure is used to authenticate the payer and account, electronic check document and issuing bank, and to securely seal the electronic check, permitting the use of public networks for sending the electronic check. Most importantly, digital signatures may be used to verify a document after issuance.

A public key, applied to verify a cryptographic digital signature, is always generated in conjunction with the private key which is used to create the signature. The payer's digital signature 126, the payer's public verification key 134, and the message which was signed are used as inputs to the public key signature verification algorithm, which produces a true or false value. Public key cryptographic signatures are useful because the signature of a signer, computed using the signer's private key, can be verified by anyone else who knows the signer's public key. Since the signer computes his signature on a document using his private key, and since the verifier verifies the signer's signature using the signer's public key, there must be a way for the verifier to trust the association between the signer (and his account information) and the public key used to verify the signer's signature on the electronic check. Cryptographic signatures are used to sign checks when they are written, co-signed, endorsed and processed. Cryptographic signatures are also used by certification authorities to sign certificates or "letters of reference" that contain a name or description of a signer and the signer's public key. Thus, anyone who trusts the certification authority and who knows the certification authority's widely publicized signature verification key can verify the certificate and trust the signer's public key for use in verifying the signer's signature.

A party signing an electronic check is the only entity in possession of its private signature key. The private signature key need never be exposed to a third party, making it difficult to forge. The private signature key generates a cryptographic signature in a secret code, which is unique and is identified only with the signer. Signature cards always keep the private key internal to the processor and memory on the card. The document to be signed is sent into the signature card, and the signature card uses the private key to compute the signature. The private key is never accessible via the card's connector.

The public signature key must be used in conjunction with a cryptographic signature verification algorithm upon receipt of the signer's signature to verify the signature. The public signature key is known and used by others, who obtain the public keys prior to or during a transaction. The use of public key cryptography allows the public keys to be used and stored independently of the private keys. However, the public and private keys are mathematically linked, since they are generated as a pair.

Tamper-resistant signature cards or other hardware devices are useful to compute the cryptographic digital signatures without the possibility of disclosing the signer's private signature key. Tamper-proofing of an electronic check and associated information is achieved using digital signatures and a secure hash algorithm. Signature cards, or special cryptographic processors, can be used to better secure the private keys and greatly reduce the need for diligence and skill on the part of the account holders to secure their keys, especially against attacks through network connections by computer hackers. Further, the signature card may keep a non-erasable log of documents signed, so that the holder can review whether all uses of the card have been legitimate.

One difference between an electronic check and a paper check is the presence of authenticating certificates, in particular an account certificate 136 and a bank certificate 138. The payer can expedite the establishment of trust among the parties to the transaction by enclosing with the signed check a "letter of reference" or cryptographic certificate 136 regarding the payer's account, stating the payer's name, address and telephone number 124 and Internet address 128, account number 122, and public signature verification key 134, signed by the bank holding the payer's account with its digital signature private key 140. Similarly, a second letter of reference or certificate 38 regarding the payer's bank states the payer's bank's name 142, address 144, electronic network routing code 146 and public signature verification key 148, signed by a central body such as the federal reserve with its digital signature private key 150. Therefore, anyone knowing the federal reserve's public signature verification key 152 can sequentially verify the bank's certificate 138, the account certificate 136, and then the payer's signature 126 on the electronic check.

The certificates are the electronic check mechanism for providing a trusted identification between trading partners. The trust mechanism currently used is pre-arrangement of the transaction, so that the receiving party is assured of the secure transmission of the transaction. The structure of the electronic check system with certificates enables banks or their agents, in the role of trusted parties, to provide certificates that validate the identity and authenticity of the electronic check issuer. Trading partners will be able to validate these certificates, if desired, on-line, and conduct business without pre-arrangement, but with the assurance that the other party to the transaction is authentic.

The use of certificates in the electronic check system permits validation at any point, by anyone, in the payment cycle. Electronic checks and electronic checkbooks can be authenticated by the use of public key certificates at any point in the settlement cycle by the payee or the bank. Further, deposit slips and endorsements by the payee may be cryptographically linked to an electronic check as it is processed, resulting in an electronic document suitable for archiving and use as evidence of payment.

In order for payers to determine the public signature keys of payees, and thereby help to ensure that their checks are paid to the correct person, it may useful to publish the public signature keys in a public directory. Alternatively, the payee can furnish his public signature key and certificates with the order blank, invoice or remittance information. In this case, the payer may consult the certificate revocation list (CRL) portion of the directory service to determine whether the certificate and account are still valid. Similarly, the payee may consult the CRL to determine the status of the payer's account prior to endorsing and depositing the electronic check.

An electronic check may be delivered by hand, direct transmission or public electronic mail systems. An electronic check may be printed out at the bank of first deposit and passed through the system as a paper check. The signatures and certificates are also produced with OCR and scanned by the issuing bank. Electronic checks transmitted via electronic mail may be accessed at personal computers with industry-standard protocols or Application Programming Interfaces (API's), such as VIM or MAPI, or they may be embedded within dedicated application protocols such as the HTTP server protocol used by Internet World Wide Web servers. In either case, the format of the electronic check is independent of the underlying transmission protocol. Further, disclosure of the electronic check instrument during transmission will not enable fraudulent presentation by others. Thus, the payee need not acknowledge receipt of the electronic check. However, the payer's e-mail address is included to permit acknowledgement. Systems providing certified electronic mail may be used to provide a guarantee of delivery.

Upon receipt of the signed electronic check and associated order, invoice or remittance information, the payee processes the payer's order, extracts the electronic check and endorses the electronic check. The endorsement is done by the payee's electronic checkbook, which signs the check, adds its own endorsement information and appends the payee's certificate information. The payee's PCMCIA card also automatically assigns sequential transaction numbers to endorsements to ensure that each endorsement is unique. This number should be included in the deposit and clearing information, so that the payee can reconcile checks mailed to the payer's bank for cashing with the deposits recorded in his bank statement.

Upon endorsing the electronic check, the payee creates a deposit instrument 160 which is attached to the electronic check 110, as shown in FIG. 6. The deposit instrument 160 may contain some of the same information as in the endorsement, such as the payee's account number. The deposit instrument 160 contains an identification number 162, the date 164, and the sum of money to be deposited 166. It also contains the payee's account number 168, the name, address and telephone number of the payee 170, the payee's Internet address 174 and the payee's signature 175 in digital format readable using the payee's public signature key 172. The deposit instrument 160 also may contain a memo line 180.

The deposit instrument may also contain an account certificate 190 and a bank certificate 192. The account certificate 190 states the payee's name, address and telephone number 170 and Internet address 174, account number 168, and public signature verification key 172, signed by the bank holding the payee's account with its digital signature 176. Similarly, the bank certificate 192 regarding the payee's bank states the payee bank's name 178, address 182, electronic network routing code 184 and public signature verification key 186, signed by a central body such as the federal reserve with its digital signature 188. Anyone knowing the federal reserve's public signature verification key 152 can sequentially verify the bank certificate 192, the account certificate 190, and then the payee's signature 175 on the electronic check.

The endorsement function of the electronic checkbook need not be as secure as in the case of originally signing an electronic check. However, a heightened level of security is needed if the same signature card is used by the payee for both check writing and endorsement.

The endorsed check is then forwarded to the payee's bank to be deposited or cashed, with the proceeds to be deposited to the payee's account. Payments or deposits consisting of electronic checks are gathered by banks via e-mail or other protocols and cleared through standard banking channels, such as bilateral agreement, ACH or ECP, automatically following the bank routing code 146.

Upon receipt of the endorsed check after clearance, the payer's bank verifies that the check was properly endorsed using the payee's public signature key. It also verifies the payer's signature, and optionally the account and bank certificates. The amount of the check is debited from the payer's account, assuming available funds, and then stored for archival purposes. Finally, an ACH credit transaction is originated to settle with the payee bank (or multiple transactions with the payee bank may be settled in an accumulated group), which credits the proceeds of the cashed check to the payee's account at the payee's bank. If the size of the check so warrants, the payee's account may be credited by Fed Wire or other expedited processing. For example, the payer's bank may e-mail notification to the payee's bank for crediting prior to receipt of actual funds by other means.

The payer's bank will return the endorsed electronic check to the payee if it cannot be cashed, e.g. due to insufficient funds, or if the deposit transaction fails, e.g. the payee's account is closed. For example, if the deposit transaction fails, the payer's account may credited with the amount of the returned check in some flows.

The payer's and payee's banks provide statements or reports to the payer and the payee, respectively, regarding their electronic check transactions. These statements may be generated electronically or on paper. The payer's bank may include a copy of the electronic check with the payer's statement. The payee's bank may identify the payee's deposit transaction on the payee's statement, including the deposit number, so that the payee can reconcile an electronic check sent electronically to the bank for cashing with the transactions actually credited to the payee's account.

The primary security element of electronic checks is the use of an electronic checkbook in the form of a PCMCIA card, which generates an electronic check and stores a record of it in a secure check register. Possibly suitable PCMCIA cards are Tessera, National Semiconductor's iPower and the Telequip CryptaPlus card. Alternatively, the electronic checkbook may be implemented in an ISO format IC chip smart card or smart disk (perhaps without the check register due to memory limitations), or it may be implemented in cryptographic hardware processors for use by systems that process large volumes of checks or maintain a number of electronic checkbooks. The PCMCIA card is ideal for a transaction between two personal computers, but the smaller and more portable smart card is better suited to a POS transaction at a merchant's premises (if the appropriate smart card reader is implemented).

A PCMCIA card is an electronic device that provides greater security for a financial transaction. A PCMCIA card, or in the case of mainframe accounting systems, a secure black box, e.g. a Racal's Guardata, protects transactional systems from unauthorized access. The PCMCIA card is a separate, narrowly defined, secure electronic environment used in conjunction with a terminal such as a personal computer. Information passes back and forth between the PCMCIA card and the terminal or workstation.

The tamper-resistant PCMCIA card contains a mechanism to generate or store unique check identifiers and calculates and verifies digital signatures and certificates using public key cryptography. The PCMCIA card securely stores the user's private cryptographic key, which is used to digitally sign electronic checks when they are written and endorsed. The PCMCIA card is preferably initialized by deriving its own random private key using an internal hardware random number generator. Certificates are provided and backed by a Certificate Issuing System (CIS).

The PCMCIA card is also protected by providing for entry of a personal identification number (PIN). The PIN and private signature key must be stored in the electronic checkbook in such a way that they cannot be read out through the electronic interface of the electronic checkbook. Some mechanical action may be required of the payer for each new check, either reinsertion of the PCMCIA card into its port on the payer's workstation or activation by a push button on the card itself, to guard against fraudulent use of the card once it is attached to the payer's computer. Additionally, a time-out mechanism may be used. The PCMCIA card also maintains a register of checks signed and issued. The electronic check register should be kept in the PCMCIA card for security reasons, and it should be read only from the PCMCIA's interface. The register may be read, but not overwritten.

Figure 9:
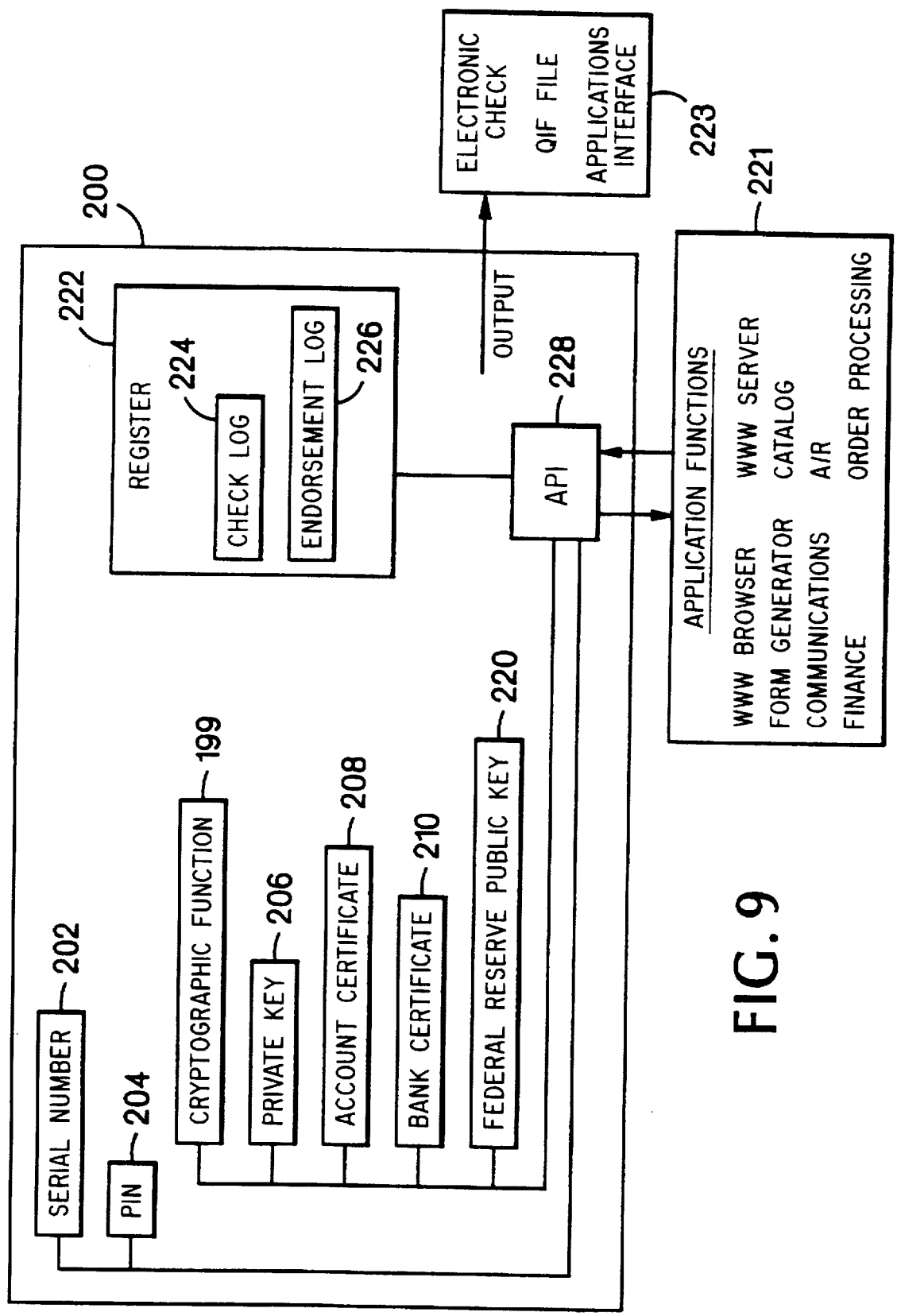
FIG. 9 is a block diagram of an electronic checkbook card.

As seen in FIG. 9, a PCMCIA card 200 must contain at least the PCMCIA card serial number 202, the PIN 204, the cryptographic function 199, the signer's private signature key 206, and check and endorsement logs 224 and 226 in a register 222. The public keys for the federal reserve 220, the account certificate 208 and the bank certificate 210 may be kept on the PCMCIA card, but storing them in the workstation permits verification using the federal reserve's public key in the case of suspected alteration of the certificates. The electronic checkbook should be accessed using a standard API 228. The input and output of the electronic checkbook should be compatible with mail user agents, file editors and other software for general uses, as well as specialized financial applications, on a variety of platforms including personal computers and workstations.

The electronic checkbook contains a register 222 that functions like a conventional checkbook register, but without account balances. When an electronic check is created, the electronic check number, date, amount, payee, signature and hash are recorded in a check log 224. For each deposit made into the electronic check account endorsed by the electronic checkbook, the deposit number, date and amount are stored in an endorsement log 226. If the electronic checkbook has the capability, there may also be entries for bank fees and interest earned on the account. Integrating the electronic checkbook with other software applications would allow the electronic check account to be automatically balanced. Since the register may only have a limited memory space, the oldest transactional items are removed automatically when the memory has been exhausted.

The PCMCIA card 200 acts as an electronic checkbook in conjunction with various application functions 221. For example, an interface with the Internet is set up in a World Wide Web browser and server. There is also a form generator for electronic checks and other forms. In particular, a merchant will have applications such as a sales catalog, accounts receivable and order processing. There are also communications and other personal finance application functions. The output 223 of the PCMCIA card is an electronic check, either signed by the payer or endorsed by the payee. A QIF formatted file or an applications interface file are generated in software outside the electronic checkbook.

Figure 10:
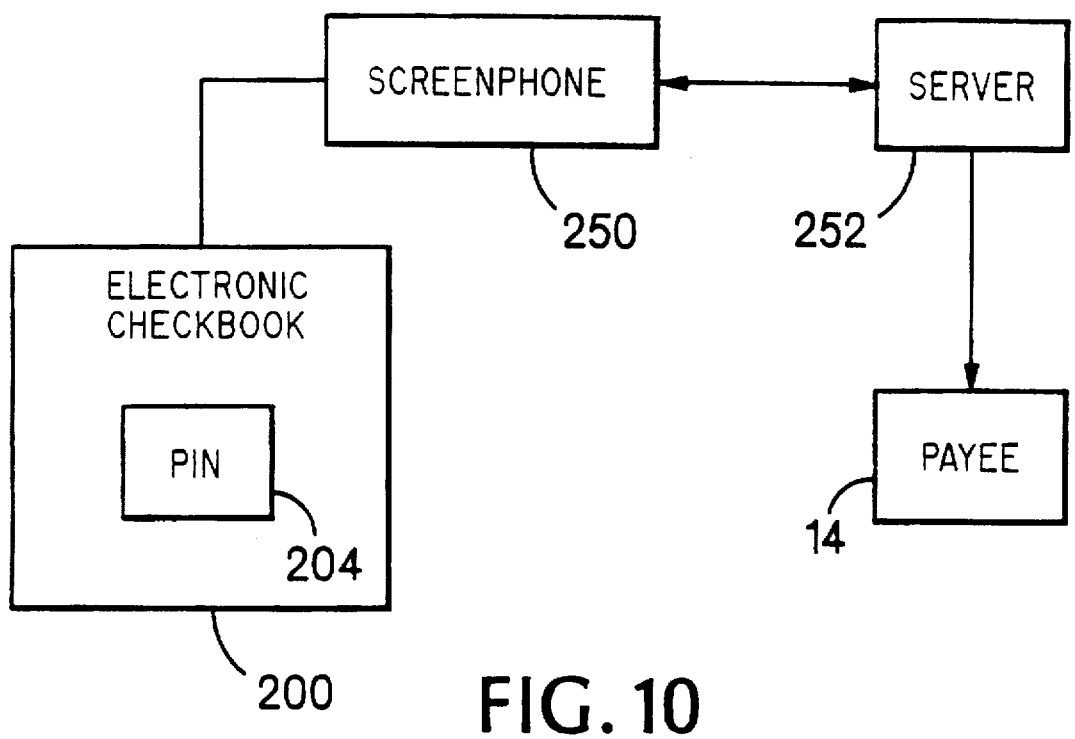
FIG. 10 is a block diagram of the interaction between a screenphone and a server.

The electronic checkbook 200 should also be compatible with a screen-based telephone 250 connected to a dial-up server 252, as seen in FIG. 10. In this case, most of the contents of the electronic check would be assembled by the screenphone 250 and the server 252 using information stored by each. The variable information, such as the payee and amount, would be sent from the screenphone to the server as part of the on-line transaction. To complete the electronic check, the screenphone would enable the electronic checkbook 200 using the payer's PIN 204, the electronic checkbook would sign the electronic check, and the screenphone would send the signature to the server. The server would verify the signature and assemble the completed and valid electronic check for mailing to the payee 14.

The PCMCIA card prefixes each electronic check with its serial number, which is imbedded in the processor of the card during its manufacture. This number helps determine whether the electronic check was signed by a legitimate electronic checkbook in case of fraud investigations. The PCMCIA card also automatically increments the numbers of the electronic checks. Since the check numbers for each PCMCIA card will be sequential and since each PCMCIA card will have its own public signature key, every check will be unique.

Another feature of the PCMCIA card is the use of a secure hash algorithm (SHA), such as an NIST Secure Hash Algorithm, with respect to documents or information associated with or attached to an electronic check. This feature "seals" the associated information and binds it to the signed electronic check. The payee can then verify that the associated information belongs with the electronic check and has not been change after the electronic check was signed.

The only function which must be performed by the PCMCIA card is creating the signature, since the payer's private signature key can never be allowed to leave the PCMCIA card, for security reasons. However, better security is achieved if the SHA of the electronic check is also performed by the PCMCIA card, so that the PCMCIA can be sure that the number, date, payee and amount logged into the PCMCIA card are the ones used in the computation of the SHA.

The electronic checkbook is issued by the bank that holds the electronic checking account. Initialized electronic checkbooks may be sent to the account holder, in which case the PIN should be sent separately for security reasons. Alternatively, uninitialized cards may be distributed to bank branches. The bank officer can then use a trusted initialization terminal and a special smart card identifying the bank officer to established a secure connection to a centralized CIS. The new card is inserted into the terminal to be initialized. This method has the advantage of making electronic checkbooks immediately available to new customers, accounts can be added to electronic checkbooks already being used by the customer, and certificates can be refreshed prior to their expiration dates without issuing new electronic checkbooks. The bank, or its agent, is also acting as a certifying authority since it is responsible for authenticating the identity of the electronic checkbook holder and for ensuring that the electronic checkbook and PIN are delivered to the correct person. The electronic check may also support correspondent banking relationships, and will allow another bank or approved third party to act as a stand-in processor for electronic checks for banks that are unable to directly support the processing requirements for electronic checks. This will facilitate electronic check deployment in a secure way without affecting the traditional bank-customer relationship.

Similar functions to those of the PCMCIA card can be served by large scale cryptographic processors, such as Atalla or Racal Guardata boxes, for large operations where individual signature cards are impractical. For servers or mainframes which issue or endorse a large volume of checks, or which issue or endorse checks on behalf of a number of account holders, the processing and key storage capacities of signature cards may be exceeded. In this case, special cryptographic hardware must be used.

Although the electronic check's primary use is to make electronic payments on public networks, it may be used in any situation where a paper check would be used. For example, banks will use electronic checks to gather electronic deposits from public network users, providing an opportunity for complete full service electronic remote banking anywhere the customer is connected. POS and ATM implementations are also possible.

The electronic check also provides a generic model for all electronic, digitally signed and authenticated financial instruments. The check provides a well understood model for payment, and its electronic analog is necessary for electronic commerce, even if other forms of electronic payment exist. The electronic check will tie other forms of payment into the financial infrastructure, since checks end up involved at some point in most payment mechanisms.

Through specification of user-defined attribute parameters and routing information, the electronic check, unlike a paper check, can be made to resemble other financial payments instruments. The flexibility of the parametric approach enables multiple electronic payments instruments to meet current needs, while providing for new financial instruments. The electronic check may embrace a wide variety of the debit and funds transfer functions found in today's banking, as well as other functions yet to be introduced. The provision of new parameters would enable a variety of simple and compound transactions, such as cashier's and certified checks, drafts on a savings account or lines of credit, traveler's checks, credit card debits or credits, foreign or multi-currency drafts, and "split" or "limit" checks that may be endorsed "up to" a predefined limit. These possible instruments will present new processing options. For example, an electronic check may be made out such that it is valid up to a certain amount, e.g., for a hotel room deposit. When endorsed, the electronic check can then be endorsed for the actual amount of the expense, up to the previously defined limit. Other examples may include letters of credit, loan agreements and loan applications. In some cases, changing the instrument type may change the conceptual flow, or routing information; in other cases, the flow may remain unchanged.

Figure 11:
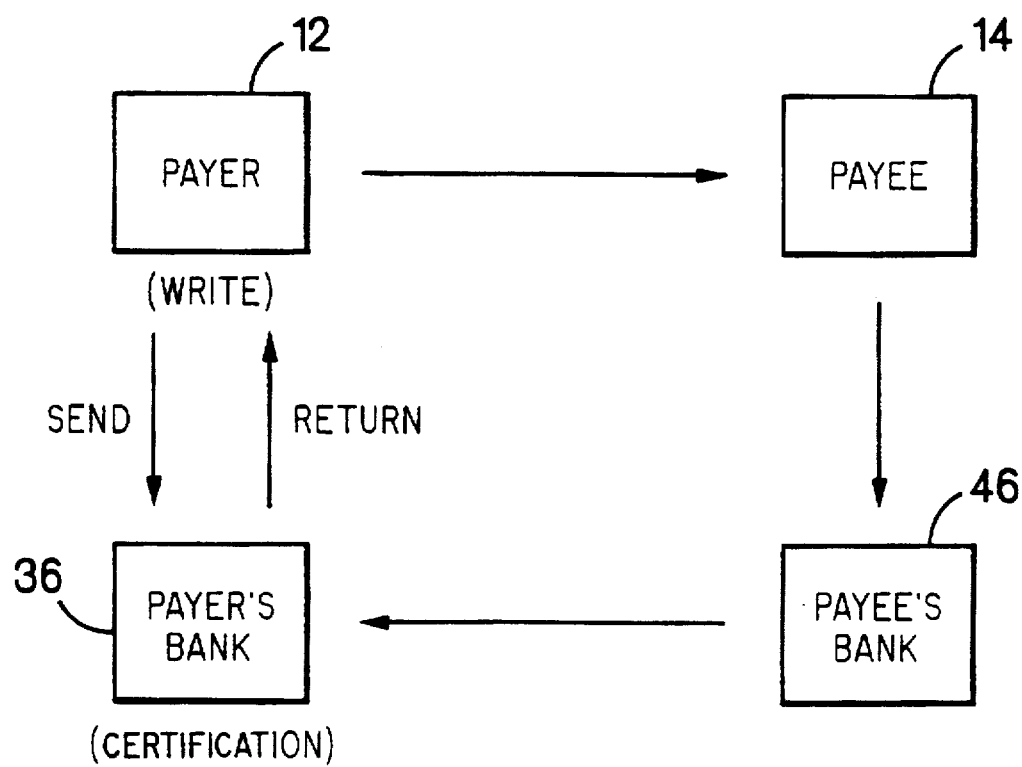
FIG. 11 is a block diagram of a certified check transaction.
Figure 12:
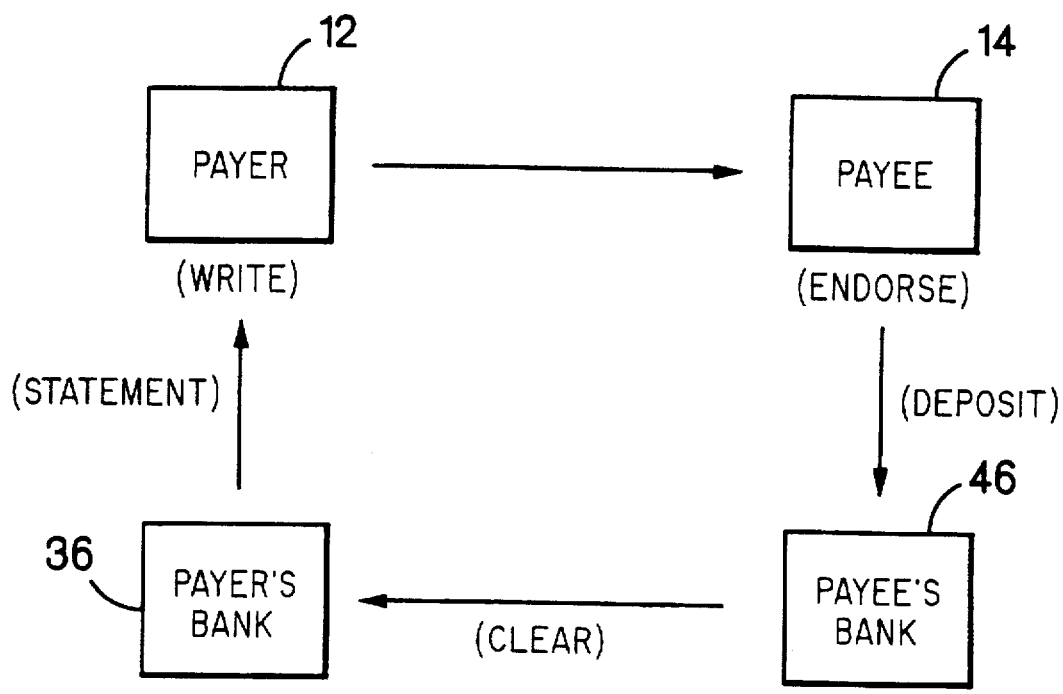
FIG. 12 is a block diagram of a normal transaction flow.
Figure 13:
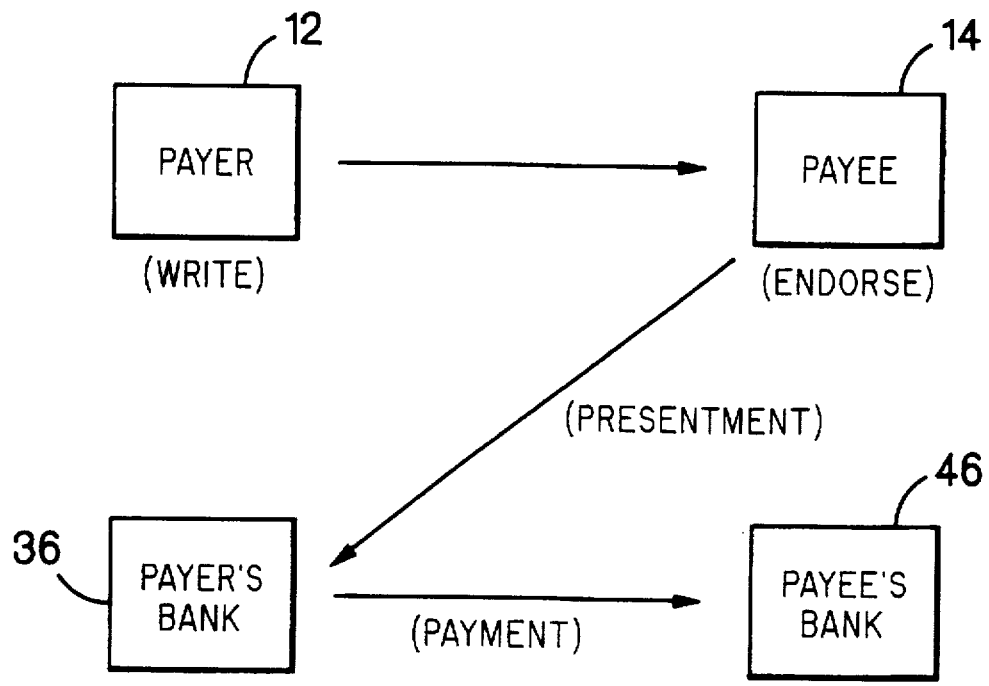
FIG. 13 is a block diagram of a cash and transfer transaction flow.
Figure 14:
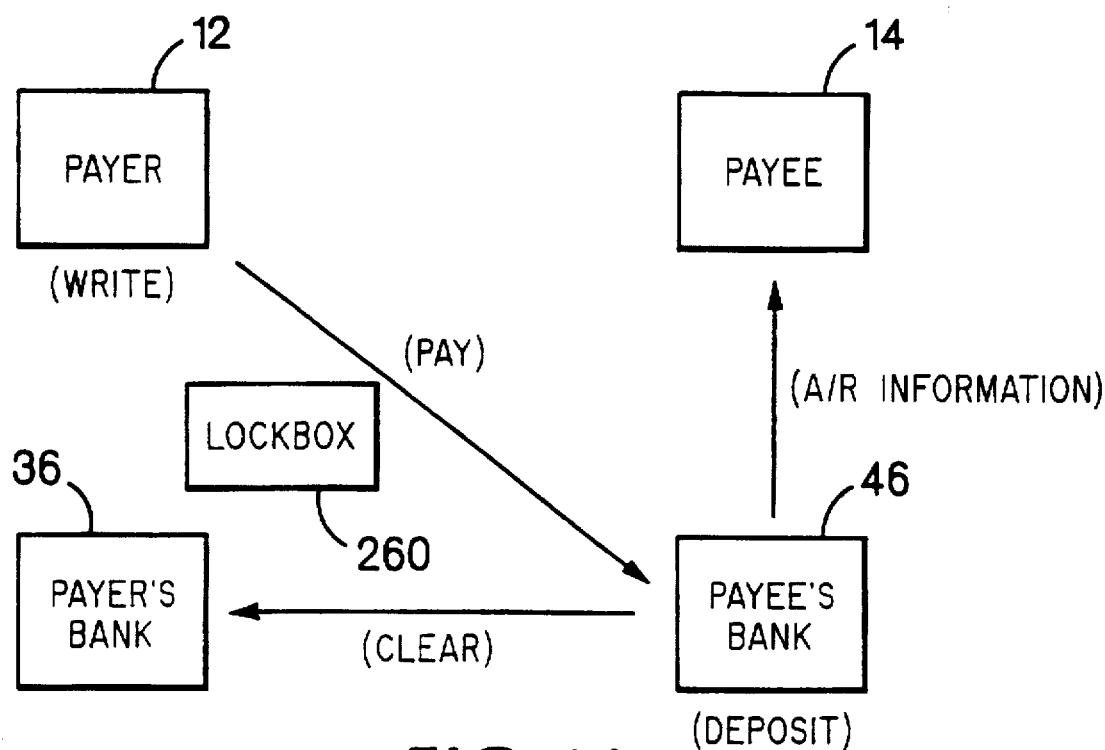
FIG. 14 is a block diagram of a "lockbox" transaction flow.
Figure 15:
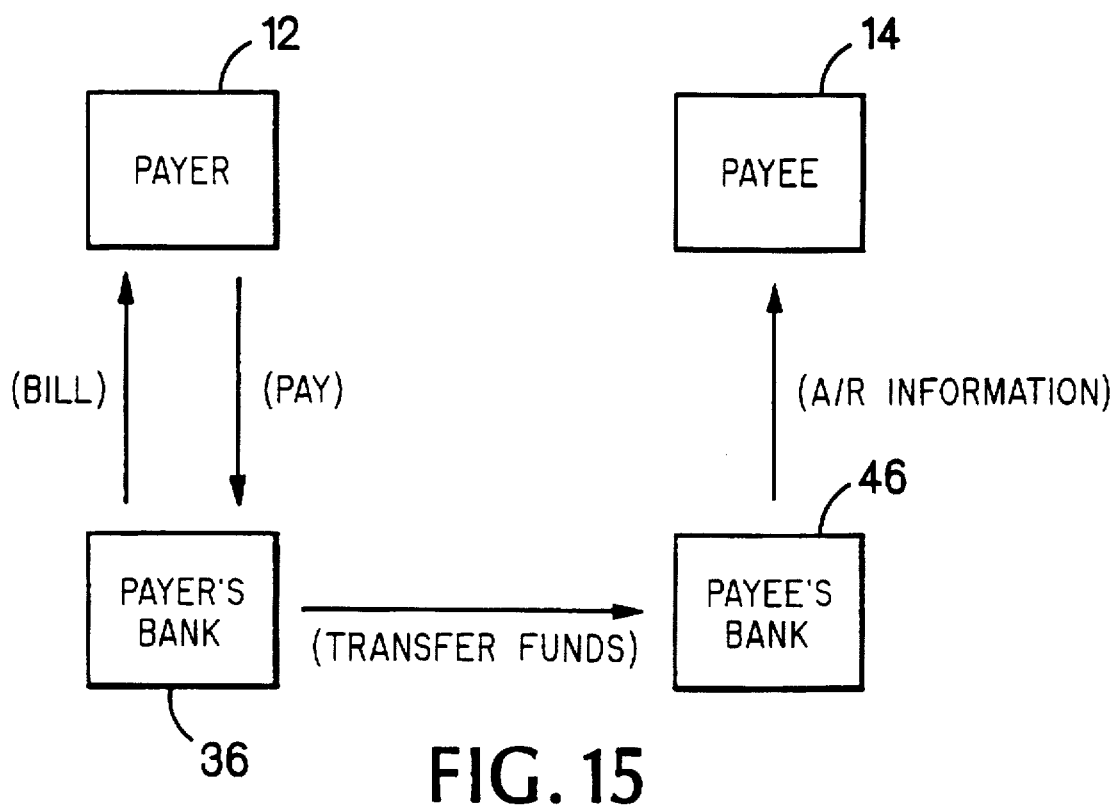
FIG. 15 is a block diagram of a funds transfer transaction flow.

For example, as seen in FIG. 11, a certified electronic check involves a payer 12 creating an electronic check in the usual manner as described above. Certified checks are endorsed and cashed similar to normal checks, except that the payee 14 is guaranteed that the funds are available. The payer 12 e-mails the electronic check to the payer's bank 36 for certification. The bank may require the use of privacy enhanced mail or an equivalent to ensure the identity of the payer and that the communication with the payer is confidential. The bank will then append a certifying signature to the check and e-mail it back to the payer. Upon receipt of the certified electronic check, the payee can verify the bank's certification signature as part of the validation of the check.

As seen in FIGS. 12-15, there are multiple scenarios for the functional flow of electronic checks. In the "deposit and clear" scenario (FIG. 12), the payer 12 receives a bill or invoice from the payee, issues an electronic check, and sends it to the payee. The payee 14 endorses the electronic check and presents it to his bank 46 which, in turn, will settle it with the payer's bank 36. This is the usual format, as described in detail above. In the "cash and transfer" or "Z" scenario (FIG. 13), the payer 12 receives a bill or invoice from the payee, issues an electronic check, and sends it to the payee. The payee 14 endorses the electronic check and presents it directly to the payer's bank 36, which sends payment to the payee's account at his bank 46. For the "lockbox" scenario (FIG. 14), the payer 12 receives a bill or invoice from the payee 14, issues an electronic check, and sends it to the payee's bank 46, either directly or via a lockbox 260 or other secure intermediary. The payee's bank 46 then sends accounts receivable information to the payee and clears the payment with the payer's bank 36. In this scenario, there may be no payee endorsement. Finally, in the "funds transfer" scenario (FIG. 15), the payer 12 receives a bill or invoice from his bank 36 (assuming electronic bill presentment allows for capture of the payee's bills by the payer's bank), issues an electronic check, and sends it to his bank. The payer's bank 36, in turn, transfers funds to the payee's account at the payee's bank 46, which sends a record of the transaction to the payee 14 with accounts receivable information.

It is clear that electronic checks can be used directly between individual parties, or through third party service providers. Electronic checks can be exchanged consumer to consumer, consumer to business, business to consumer, and business to business. If the payer is a business, then the requirements for signing and logging capacity in the electronic checkbook may be greater due to volume requirements.

The formats of an electronic check and the entire electronic check system will be uniform, so that the electronic check system may be interconnected and used in conjunction with standard Application Programming Interfaces (API's), such as standard electronic checkbook interfaces and electronic check display interfaces. API's apply on the level of individual check processing as well as integration of the entire system. For example, the C language may be used to define an electronic check with field such as the date, the amount and the payee. Also, the Internet World Wide Web browser interacts with the electronic checkbook using an API to create the complete electronic check. The electronic check API's do not change, so that the system may be interfaced with any system by rewriting the particular system API and the link to the electronic check system.

Figure 16:
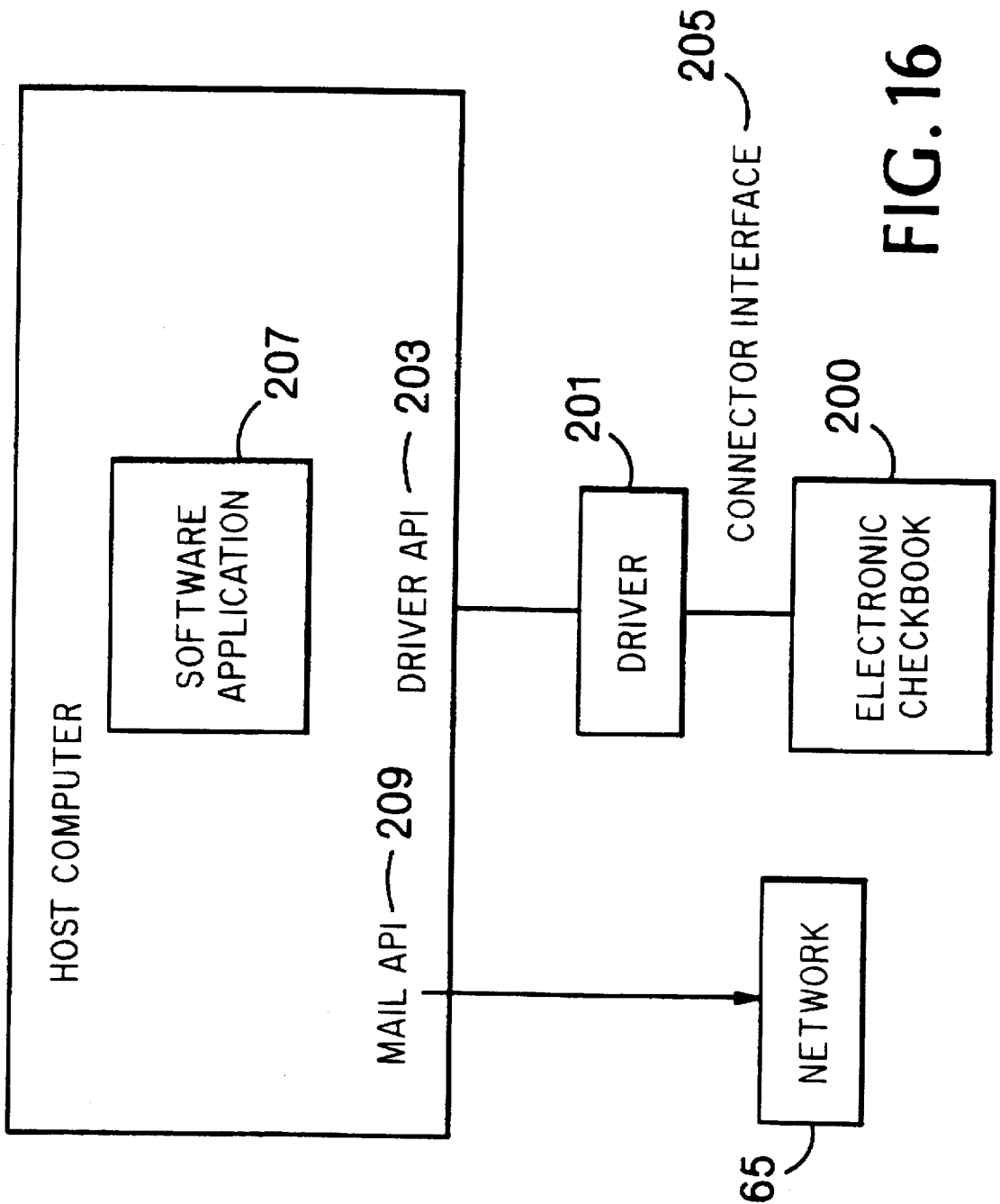
FIG. 16 is a block diagram of an electronic checkbook application interface.

For example, as seen in FIG. 16, an electronic checkbook 200 sends an electronic check over the network 65 after interfacing with a driver 201 at a connector interface 205. The driver 201 works under a driver API 203, which is connected to the signer's application software 207. Through a mail API 209, the completed electronic check is sent over the network 65.

The electronic check system may be considered a module which provides services to other modules and to API's. The flow of an electronic check through the system is governed by a series of protocols. The API's provide electronic check services to user interface applications, to financial applications such as bill payment, and to third party applications. The modular design of electronic checks also permits separation of the cryptographic functions from the applications which write and endorse checks, both physically and logically, to facilitate application of the cryptographic infrastructure to secure other financial instruments or documents; i.e., two cards may be used.

The five primary applications and API's needed for the electronic check system are management, check writing, check acceptance and endorsement, check clearing and reconciliation. Management functions allow for card issuance, inactivation, reactivation, and signature key management functions. Check writing is assumed to be performed by the payer, acceptance and endorsement by a payee, clearing by the banks, and reconciliation by the payer. Most users and organization will assume the roles of both payer and payee, but at different times.

There is a base set of supporting modules. These base modules provide for the creation, destruction, and manipulation of a parameterized electronic financial instrument (the electronic check), the interpretation of such instruments as electronic checks, the generation and verification of digital signatures on the payment instruments, and the interaction with electronic checkbook hardware devices.

API functions for supporting the application needs described include a "write" function, for creating an electronic check, binding it to an attached document (if present) and signing the electronic check; a "co-sign" function, for appending a second signature to the electronic check; a "verify" function, for verifying signatures on a check and validating the binding to an associated document (if present); an "endorse" function, for verifying signatures on the check, and if valid, appending an endorsement and signing the check to be deposited or cashed; a "register read" function, for reading the contents of the check register contained in the electronic checkbook; and a "register entry" function, for appending an entry to the check register.

For example, an electronic check can be attached to electronic remittance information provided by a remote payee. This enables the payment to be made, routed correctly and automatically posted to both parties' accounting systems. Integration with micropayment accounting systems for high volume, small value financial transactions will enable those systems to settle accounts using an electronic checks. The standardization of the electronic checkbook interfaces and the API's to access electronic checkbook functions simplifies integration with a variety of home and small business accounting and communications software packages. By defining the layout of the electronic check, the information it contains (e.g., account number and amount) can be readily extracted from the electronic check and used in other applications through the API's.

Additional API functions are used to process ancillary electronic messages such as acknowledgment of deposit, returned checks, and electronic statements. The parametric financial instrument approach allows reuse of the cryptographic infrastructure, especially the verify function, to safeguard the integrity of these messages. For instance, the verify function can be used by the payee to verify the signature of the payer, as well as by the payee's bank and the payer's bank to verify check signatures and endorsements prior to further processing to cash or clear the electronic check.

The API functions will be implemented by a combination of software operating in the user's personal computer and in the electronic checkbook hardware. In the case of a PC Card, using the PCMCIA interface and standard Card and Socket Services, most of the functions may be implemented on the PC Card since it can support substantial processing, memory and interface bit rate. This approach maximizes the portability of electronic checking information because the electronic checkbook register function is physically coupled to the signature function.

Figure 17A:
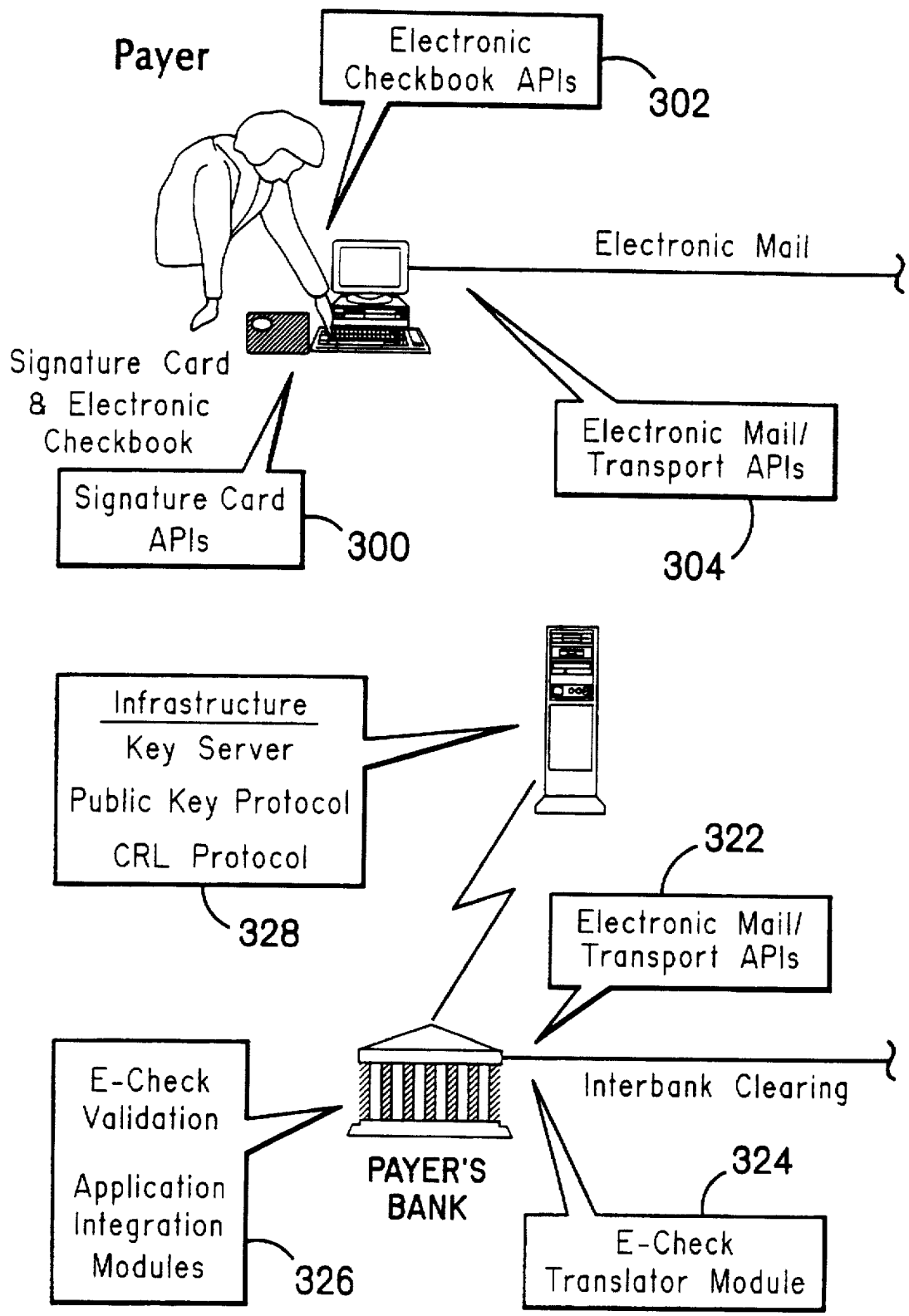
FIGS. 17A and 17B are block diagrams of electronic check API's, modules and protocols.
Figure 17B:
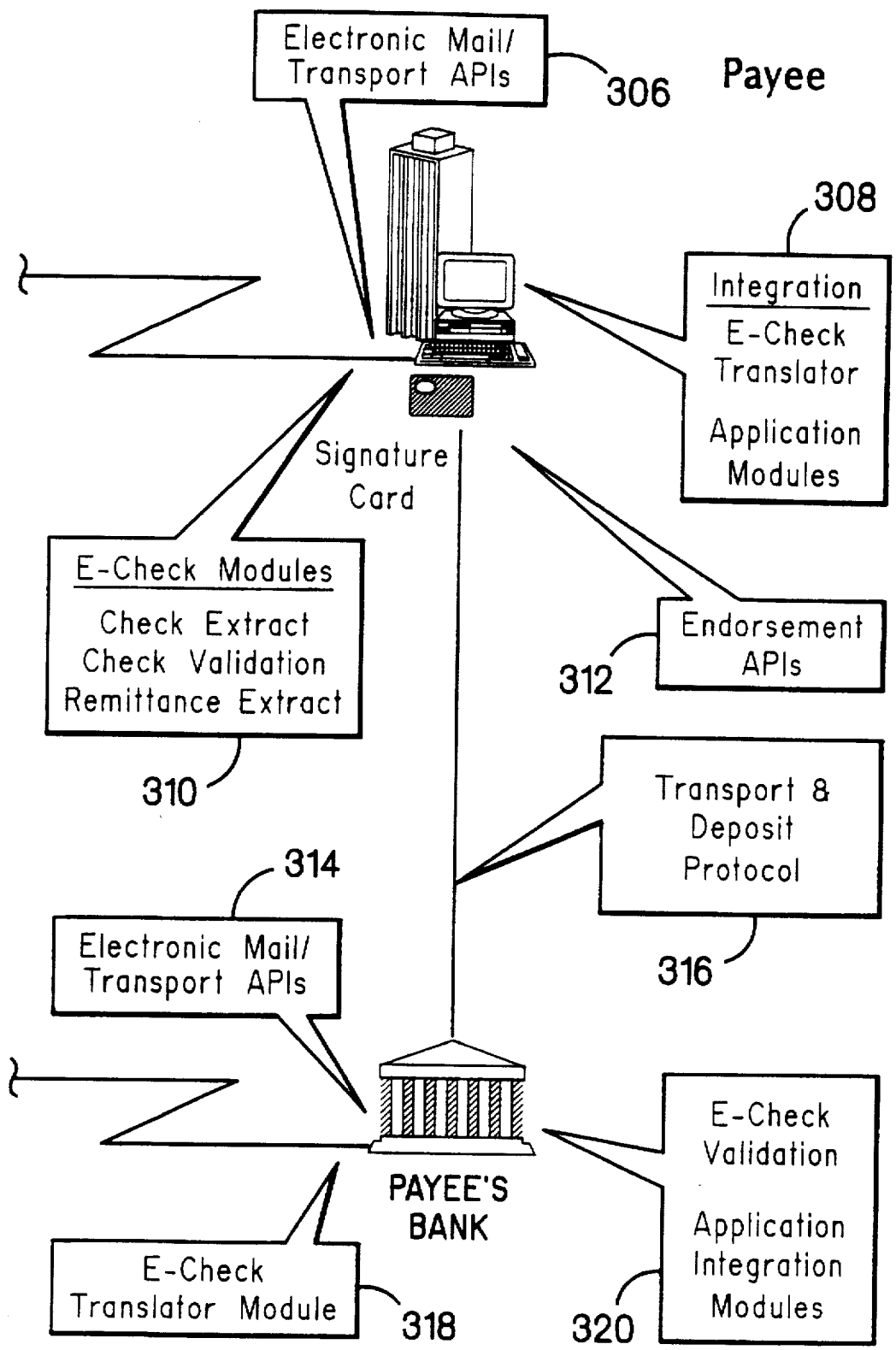

The electronic check functions in an environment of programmatic tools, including interacting API's, modules and protocols. As seen in FIGS. 17A and 17B, an electronic check is generated at the payer's workstation using signature card API's 300 and electronic checkbook API's 302. The electronic check is transmitted by the payee using electronic mail and transport API's 304. The payee's workstation also receives the electronic check through its electronic mail and transport API's 306. The electronic check is integrated into the software of the payee's workstation using an electronic check translator module and is acted upon by the software in application modules 308. The electronic check modules 310 include extraction of the check from the transmission, electronic check validation, and extraction of the remittance originally sent from the payee to the payer. After applying endorsement API's 312 to endorse the electronic check, the payee's workstation transmits the endorsed electronic check to the payee's bank for deposit using its electronic mail and transport API's 306.

The payee's bank receives the endorsed electronic check via its electronic mail and transport API's 314 according to a defined transport and deposit protocol 316. The modules applied by the payee's bank include an electronic-check translator 318, electronic check validation and application integration modules 320. After interbank clearing, the electronic check with the payee bank's endorsement is sent electronically to the payer's bank, which receives the processed electronic check through its electronic mail and transport API's 322. The payer's bank also has modules such as an electronic check translator 324, and electronic check validation and application integration modules 326. The electronic check infrastructure is governed by a computer at the payer's bank or its agents which contains protocols 328 for the key server, public keys and the CRL.

The electronic processing scheme may also be applied to "exceptional" cases, such as electronic checks returned due to insufficient funds in the payer's account. Since exceptions processing provides for dealing with a problem in the normal flow of the electronic check through the system, the conventional paper check procedure may be necessary, although aspects of the electronic procedure may be used as support for more expedited exceptions processing.

Solutions to the problem of potential fraudulent usage of electronic checks must be built into the system at each stage of the processing of an electronic check to ensure the integrity of the entire system.

The security measures discussed above will eliminate most of the causes of losses due to bad checks, including forgery, alteration, duplication, and fraudulent depositing. Forgery is prevented by ensuring that digital signature keys are stored in secure hardware devices and through appropriate controls over the validity of electronic check certificates. Alteration is prevented by the application of digital signatures to the electronic check and through the use of the SHA function which creates a unique digest of the electronic document.

Duplication is a somewhat more difficult problem to prevent, since by its very nature an all-electronic document can be easily reproduced. Although each of the payee, the payee's bank and the payor's bank verifies that there is no recent duplicate check, the problem of duplication is addressed in several additional ways. First, electronic checks must be dated and will expire more rapidly than paper checks. Second, electronic check certificates will also expire, preventing their use after a given time period. This ensures that the accounts are periodically refreshed, and that the bank has an opportunity to ensure the integrity of the secure key storage device. Third, the issuer bank keeps an archive of electronic checks which have been presented previously. In addition, an "active" check file will be used against which checks can be matched. This file need only store the checks for valid dates, as mentioned above, and the electronic check serial number and hash information to identify a duplicate. Also, the payer may send check details such as the check number, date, signature, payee and amount to the payer's bank at the same time as the electronic check is sent so that the issuer's bank can maintain a file of used electronic checks. This file can be used to determine if a duplicate electronic check was issued and paid by the payer's bank. The combination of these efforts should effectively minimize the risk of a duplicate electronic check successfully flowing through the payments system.

Fraudulent depositing is another significant issue, since electronic checks which are sent unencrypted could conceivably be deposited or "cashed" by someone other than the intended recipient. The electronic check provides for application of the intended recipient's cryptographic keys to minimize this problem.

In the event that an electronic checkbook is compromised, e.g., lost, stolen, or repudiated by a customer, then the certificates for that electronic checkbook can be revoked.

Ensuring the confidentiality of critical customer information is a priority for any network payments instrument. To this end, the electronic check need not contain existing checking account numbers which could be intercepted and then used to commit fraud by paper checks. Digital account numbers may be linked with non-electronic account numbers so that both types of transactions may take place with respect to the same account. Encryption of an electronic check is not required to prevent fraud due to the use of private key cryptographic signatures. However, electronic checks and other parameterized payment instruments may be encrypted, where possible, during transmission between parties to ensure confidentiality.

Tamper-resistance of the PCMCIA card is also needed to the extent necessary to make it economically unattractive for attackers to steal signature cards, extract the private key, and pass bad checks using the private signature key before the card is reported stolen and disabled. Any attempt to extract the private signature key should result in evident alteration of the card and should take at least a few days to succeed. However, an extremely high degree of tamper-proofing is not necessary, since the card only contains private information for one or several accounts (rather than system level secrets) and since the card holder has an incentive to report theft or tampering (rather than to extract a secret to use for fraud or counterfeiting).

Most importantly, the account and bank certificates can have expiration dates in order to limit the time during which electronic checks can be written. An account may be closed prior to the expiration of the account certificate for other security reasons, preventing verifiers from knowing that the signature on the electronic check is good until it clears. If the account is closed, its associated certificates are revoked. This is no different from the current situation in which someone continues tow rite checks using check blanks from a closed account. The rapid clearing of electronic checks will deter this behavior, and banks can offer automated check verification services which verify signatures, account status and funds availability.

Other embodiments are within the scope of the following claims.

What is claimed is:

1. A computer-based method comprising
creating an electronic instrument for effecting a transfer of funds from an account of a payer in a funds-holding institution to a payee, the instrument including an electronic signature of the payer, and
appending, to the electronic instrument, digital representations of a verifiable certificate by the institution of the authenticity of the account or the account holder.

2. A computer-based method comprising
effecting a transfer of funds from an account of a payer in a funds-holding institution to a payee in accordance with instructions of the payer, by
creating an electronic instrument which includes digital representations of (a) the instructions, (b) the identity of the payer, (c) the identity of the payee, and (d) the identity of the funds-holding institution,
including with the electronic instrument, digital representations of (a) a verifiable signature of the payer, and (b) a verifiable certificate by the institution of the authenticity of the payer and of a public signature verification key of the payer,
electronically delivering the electronic instrument to the institution at least in part via a publicly accessible data communication medium, and
at the institution, verifying the signature of the payer and the certificate in connection with transmitting the funds to the payee.

3. The method of claim 2 further comprising
including an account number in the electronic instrument.

4. The method of claim 1 in which the account comprises a deposit account in the institution.

5. The method of claim 1 in which the account comprises a credit account in the institution.

6. The method of claim 1 in which the electronic instrument comprises an electronic substitute for a check.

7. The method of claim 1 in which the electronic instrument comprises an electronic substitute for a credit card transaction slip.

8. The method of claim 1 in which the publicly accessible data communication medium is unsecured.

9. The method of claim 1 in which the institution comprises a bank.

10. The method of claim 1 further comprising
appending to the electronic instrument, digital representations of a verifiable signature of the payee.

11. The method of claim 1 further comprising
appending to the electronic instrument, digital representations of a verifiable certificate by an institution which holds an account of the payee.

12. The method of claim 11 further comprising
appending to the electronic instrument, digital representations of a verifiable certificate by a central banking authority with respect to the institution which holds the payee's account.

13. The method of claim 1 further comprising
delivering the electronic instrument in part via a private controlled secure communication medium.

14. The method of claim 1 further comprising
delivering the electronic instrument to the payee at least in part via a publicly accessible data communication medium.

15. The method of claim 1 further comprising
delivering the electronic instrument to an institution which holds an account of the payee at least in part via a publicly accessible data communication medium.

16. The method of claim 1 further comprising
delivering the electronic instrument from an institution which holds an account of the payee to the funds-holding institution via an electronic clearing house.

17. The method of claim 1 further comprising
at the payee, verifying the signature of the payer and the certificate of the institution.

18. The method of claim 1 further comprising
at an institution holding an account of the payee, verifying the signature of the payer and the certificate of the funds-holding institution.

19. The method of claim 1 in which the signature is generated by public key cryptography.

20. The method of claim 1 in which the appending step is done by a separate signature device from the device which performs the creation of the electronic instrument.

21. The method of claim 1 in which the electronic instrument comprises an electronic substitute for a traveler's check.

22. The method of claim 1 in which the electronic instrument comprises an electronic substitute for a certified check.

23. The method of claim 1 in which the electronic instrument comprises an electronic substitute for a cashier's check.

24. The method of claim 1 further comprising
delivering from the payee to the payer, at least in part via a publicly accessible communication medium, digital representations of (a) a proposed transaction, and (b) a verifiable signature of the payee.

25. The method of claim 1 further comprising
automatically transferring information from the electronic instrument to a computer-based accounting system that tracks accounts receivable or processes orders.

26. The method of claim 1 further comprising maintaining a log of electronic instruments created.

27. Apparatus comprising a token having a memory, a processor, and a port for communication with a computer, and in which the memory contains a private encryption key associated with an account in a funds-holding institution and which is usable to append a secure, verifiable signature to an electronic payment instrument drafted on the account, and certification information provided by the institution and which is usable to append a secure, verifiable certificate to the instrument to certify a relationship between an owner of the signature and a public key of the owner.

28. The apparatus of claim 27 further comprising means for assigning a unique identifier to each electronic payment instrument.

29. The apparatus of claim 27 in which the portable token comprises a PCMCIA compatible card.

30. The apparatus of claim 27 in which the portable token comprises a smart card.

31. The apparatus of claim 27 in which the token comprises an add-in computer board or a black box crypto-processor.

32. The apparatus of claim 27 in which the certification information has a limited useful life.

33. The apparatus of claim 27 in which the memory also contains certification information provided by a central banking authority and which is usable to append secure, verifiable certificates to electronic payment instruments to certify the authenticity of the funds-holding institution.

34. The apparatus of claim 33 in which the certification information provided by the central banking authority has a limited useful life.

35. The apparatus of claim 33 in which the central banking authority comprises a United States federal reserve bank.

36. The apparatus of claim 27 in which the memory also contains a register of electronic payment instruments to which signatures have been appended.

37. The apparatus of claim 27 in which the appended signature comprises a signature of a payer who holds the account in the institution.

38. The apparatus of claim 27 in which the appended signature comprises an endorsement signature of a payee.

39. The apparatus of claim 27 in which the memory also contains a personal identification number for controlling access to the memory.

40. A computer-based method of creating an electronic payment instrument comprising forming digital payment data which represents the identity of the payer, the identity of the payee, and the amount to be paid, in a secure hardware token, appending a digital signature and a verifiable certificate by a funds-holding institution of the authenticity of the payer to the data.

41. A computer-based method of endorsing a payment instrument comprising entering information included in the payment instrument in digital form into a secure hardware token, and in the token, appending a digital signature and a verifiable certificate by a funds-holding institution of the authenticity of the payer to the digital information.

42. A computer-based method for regulating use of account numbers with respect to accounts in a funds-holding institution, comprising assigning digital account numbers for use by account holders in creating electronic instruments, the digital account numbers being distinct from non-electronic account numbers used by account holders with respect to non-electronic instruments, at the fund-holding institution, accepting electronic instruments from account holders only if the electronic instruments include one of the digital account numbers.

43. The method of claim 42 in which each digital account number is linked with a non-electronic account number, and the two numbers are linked with a common account in the institution, so that electronic instruments and non-electronic instruments may be drawn against the same account.

44. A computer-based method of attaching a document to a related electronic payment instrument comprising, forming a cryptographic hash of the document, and appending the hash to the electronic payment instrument.

45. A computer-based method for reducing fraud with respect to deposit of an electronic instrument with a funds-holding institution, comprising including with the electronic instrument a key-encrypted signature of the payee and a public key of the payee, and at the institution, automatically checking a routing code and an account number to which the electronic instrument relates before accepting the electronic instrument.

46. A computer-based method for reducing fraud associated with an electronic payment instrument comprising appending to the electronic payment instrument a cryptographic signature associated with a party to the instrument and a digital representation of a verifiable certificate by a funds-holding institution of the authenticity of the party, and upon receipt of the electronic payment instrument, automatically checking the cryptographic signature and the certificate against cryptographic signature information of other electronic payment instruments previously received.

47. A computer-based method for use with an electronic payment instrument comprising including in the electronic payment instrument, a serial number, a payment amount, a payer, a payee, and a date, transmitting the electronic payment instrument via a communication network from an inquiring party to a funds-holding institution having an account associated with the payer, at the funds-holding institution determining whether another electronic payment instrument having the same payer and the same serial number had previously been issued, electronically advising the inquiring party based on the determination.

48. A computer-based method for use with an electronic payment instrument comprising printing a paper version of the electronic payment instrument with digital signatures and digital certificates by an issuing bank of the authenticity of an account or an account holder to which the instrument relates, passing the paper version through the check clearing system to the issuing bank, at the issuing bank, scanning the paper version to derive a digital version, and at the issuing bank electronically verifying the digital version based on the signatures and the certificates.

49. Apparatus for maintaining bank account information electronically comprising a portable token holding information for enabling a user to add signatures and certifications by a funds-holding institution of the authenticity of the account or an account holder to an electronic banking instrument drawn on the account, and a separate portable token holding a register of transactions associated with the account.

50. The apparatus of claim 49 in which the separate portable token comprises a PCMCIA card or a smart card.

51. A method for regulating the use of an electronic financial document comprising including with the document an electronic signature and an electronic certification by a funds-holding institution of the validity of an account to which the document relates, accepting the electronic financial document as valid only if the signature and certification are electronically determined to be valid.

* * * * *